United States Patent [19]

Mankovitz

[11] Patent Number: 5,526,284
[45] Date of Patent: Jun. 11, 1996

[54] APPARATUS AND METHODS FOR MUSIC AND LYRICS BROADCASTING

[76] Inventor: Roy J. Mankovitz, 18842 Kilfinan St., Northridge, Calif. 91326

[21] Appl. No.: 407,192

[22] Filed: Mar. 20, 1995

Related U.S. Application Data

[60] Division of Ser. No. 969,013, Oct. 30, 1992, Pat. No. 5,408,686, which is a continuation-in-part of Ser. No. 737,211, Jul. 29, 1991, Pat. No. 5,161,251, which is a division of Ser. No. 657,477, Feb. 19, 1991, Pat. No. 5,134,719.

[51] Int. Cl.$^6$ .................................................. H04B 1/00
[52] U.S. Cl. .............................. 364/514 R; 364/514 A
[58] Field of Search ........................ 364/514 R, 514 A; 455/45, 185.1, 186.1, 66; 370/110.1, 110.4, 111; 369/6, 33, 47, 48, 86, 92; 84/6; 381/2, 4, 6, 114

[56] References Cited

U.S. PATENT DOCUMENTS 5,119,503  6/1992  Mankovitz ................................ 455/45
5,134,719  7/1992  Mankovitz ............................. 455/186.1
5,161,251  11/1992  Mankovitz .................................. 455/66

*Primary Examiner*—Ellis B. Ramirez
*Attorney, Agent, or Firm*—Christie, Parker & Hale

[57] ABSTRACT

A system for broadcasting audio music and broadcasting lyrics for display and highlighting substantially simultaneously with the occurrence of the lyrics in the accompanying audio music is provided. The system includes a audio music source that provides a data output and a analog audio signal output. A computer receives the data output by the music source and generates lyric text data and lyric timing commands. A subcarrier generator generates a subcarrier signal carrying the lyric text data and lyric timing commands. An FM transmitter broadcasts a composite signal that combines the analog output of the music source with the subcarrier signal. A lyric display unit receives the composite signal, separates and decodes the subcarrier signal and displays and highlights lyrics according the lyric text data and lyric timing commands decoded from the subcarrier signal.

4 Claims, 13 Drawing Sheets

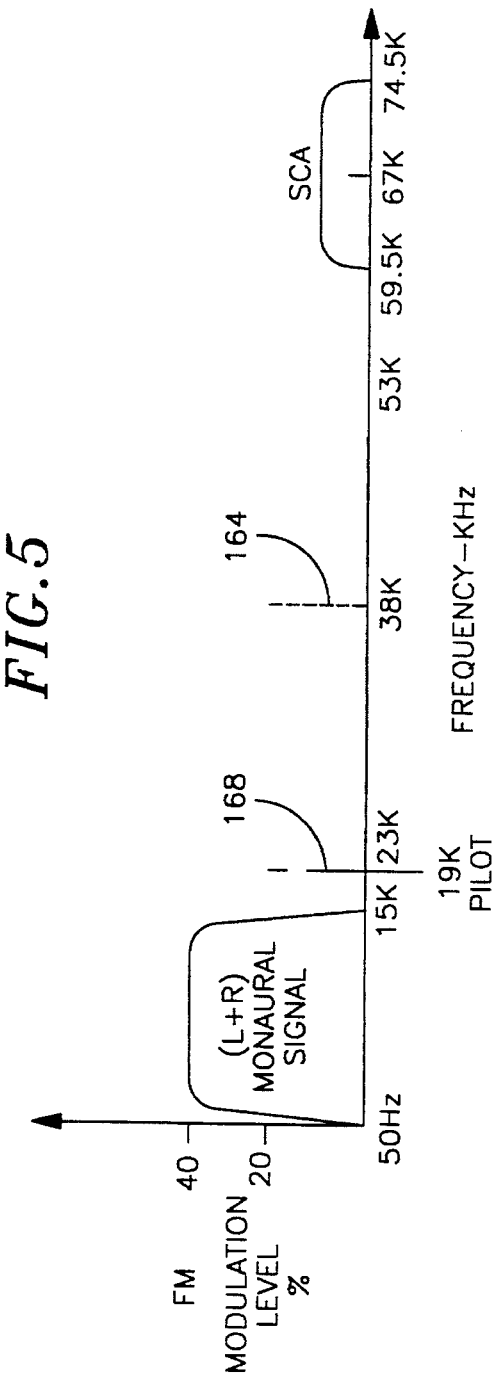
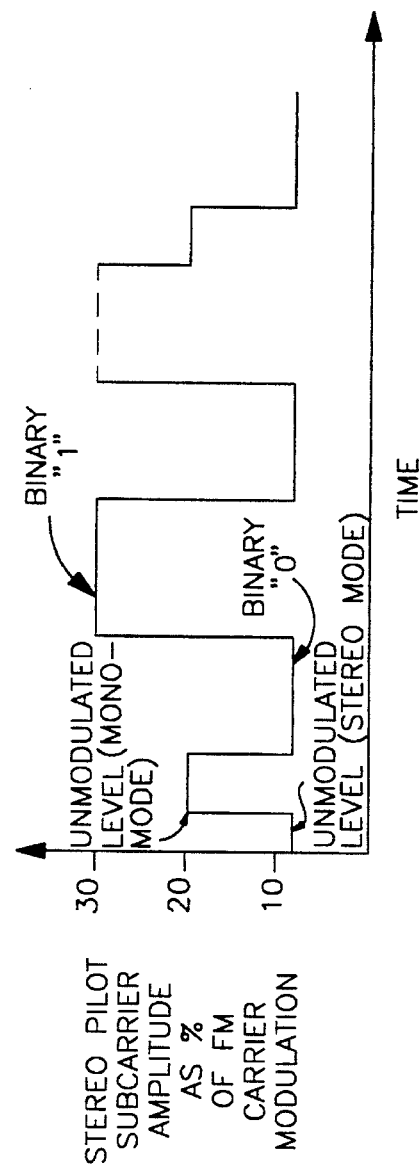

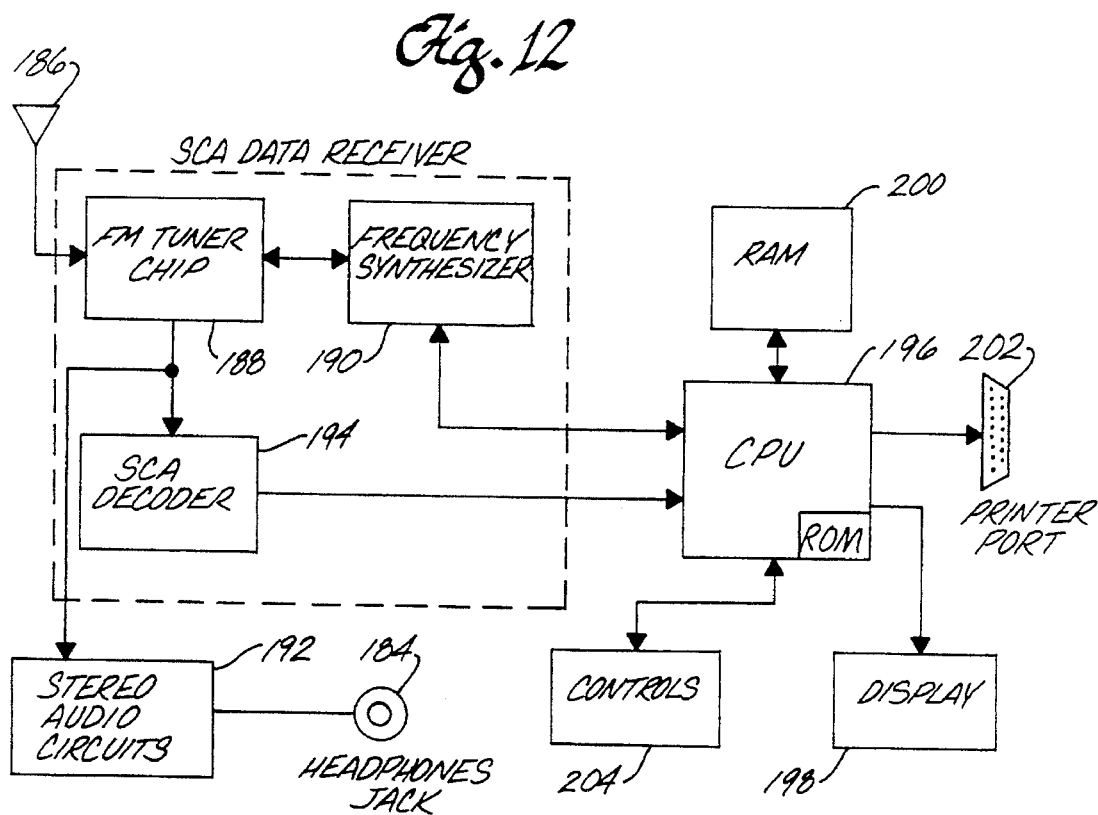
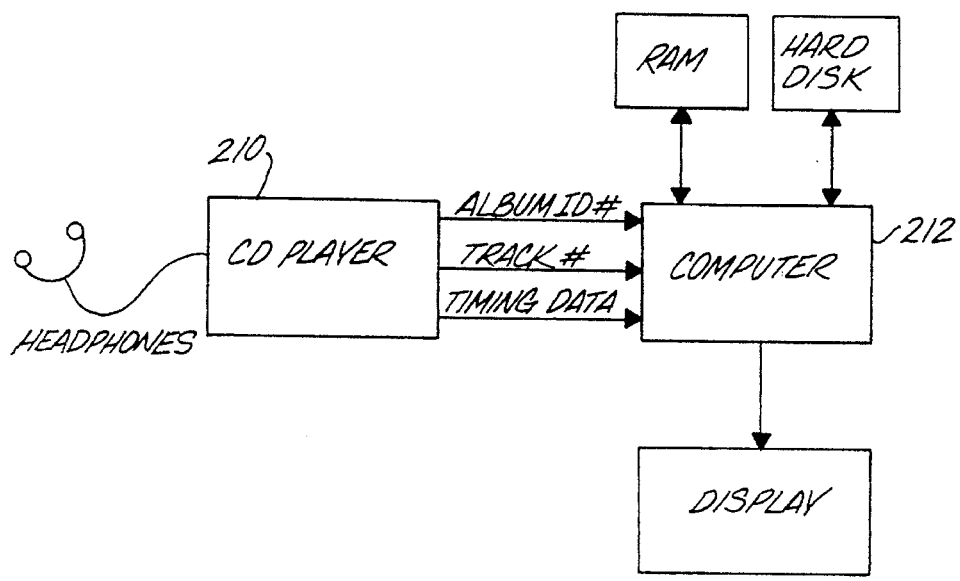

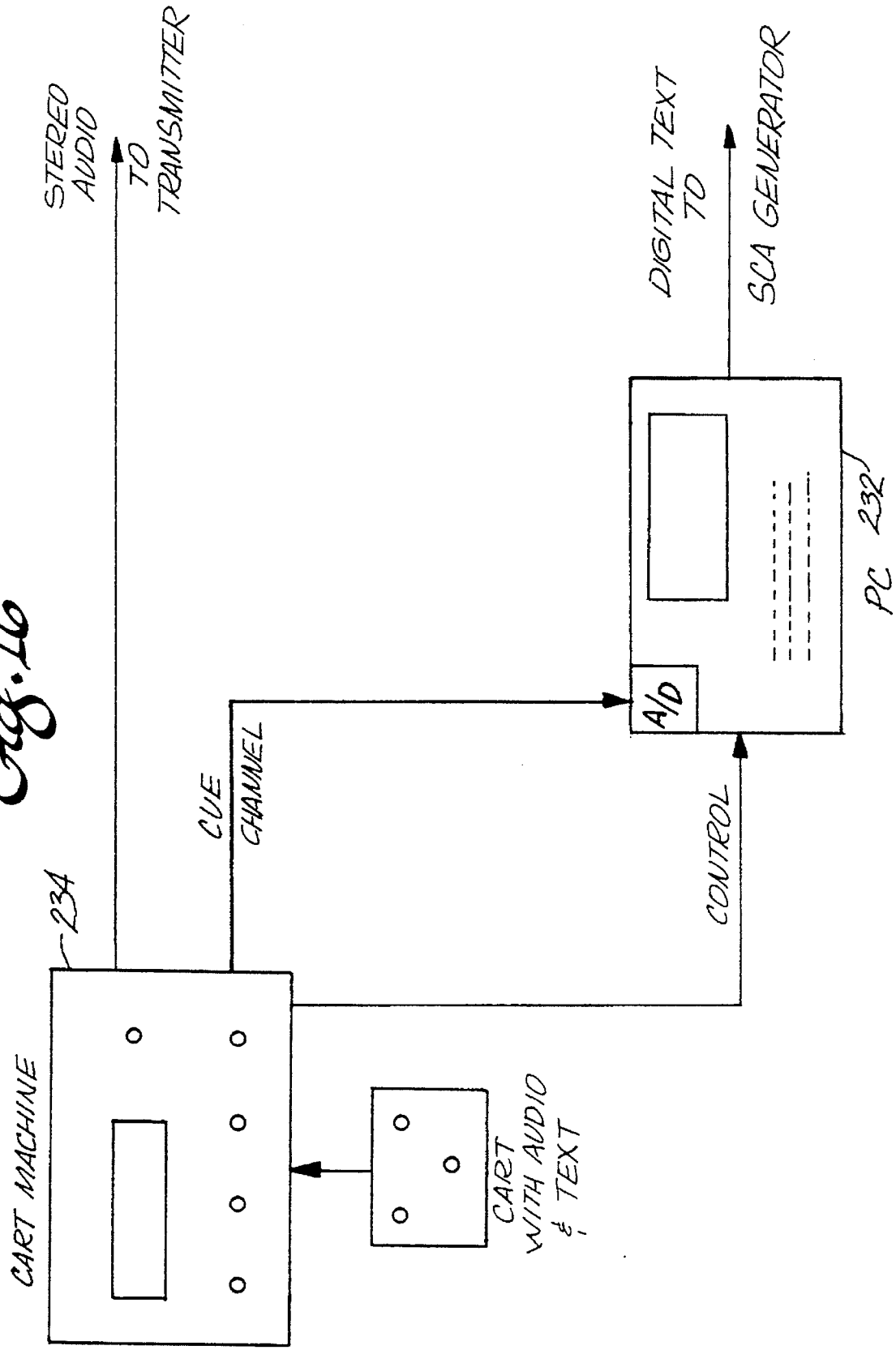

APPARATUS AND METHODS FOR MUSIC AND LYRICS BROADCASTING

This is a divisional of patent application Ser. No. 07/969,013, (now U.S. Pat. No. 5,408,686) filed Oct. 30, 1992, which is a continuation-in-part of patent application Ser. No. 07/737,211 (now U.S. Pat. No. 5,161,252) filed Jul. 29, 1991, which is a divisional of patent application Ser. No. 07/657,477, filed Feb. 19, 1991, which matured into U.S. Pat. No. 5,134,719, issuing on Jul. 28, 1992.

BACKGROUND OF THE INVENTION

This invention relates to radio broadcast systems and, more particularly, to apparatus and methods for identifying broadcast audio program selections in FM stereo radio broadcast systems and displaying lyrics of the audio program selections.

While FM broadcast station program materials generally consist of a combination of music, news, advertising, and information programs, the interest of a large segment of the listening audience is directed to the music portion of the broadcasts. In fact, the music industry cooperates with the radio stations and encourages the broadcast of the latest album releases on the basis that most album sales are the result of audience reaction to broadcast musical selections.

One of the more frustrating aspects confronting the listener concerns deciphering the lyrics of music selections received on the radio. Often the lyrics of vocal music, from modern popular music to classical music, are difficult to understand, even after the selection is heard many times. It is sometimes possible for a listener to obtain lyrics by buying the compact disc (CD) on which the selection is included. However, many compact discs do not include printed lyrics and the listener has no way to know before buying the CD whether lyrics are included. Further, the listener must buy the whole CD on which the selection is included just to get the lyrics of the one desired selection.

Even if printed lyrics are obtained by the listener, the printed lyrics do not indicate when the individual words are sung in relation to the music contained on the CD. One way of solving this problem are video sing-along systems such as "karaoke" systems. These self-contained systems reproduce musical selections, often with the lead vocal omitted and display lyrics on video screens. These systems involve expensive equipment and require the additional purchase of special recordings of musical selection that often can be only used with the sing-along systems.

Another source of frustration is the identification of the broadcast musical selections, particularly since the stations do not employ a uniform method of identification. Some stations announce the titles of a group of selections prior to their broadcast, others announce the titles after the broadcast of such a group, while still others provide such announcements on a random basis. Rarely do the stations announce the title, artist and album information for each selection. The result is that the listener is generally unable to rapidly identify and remember a particular musical selection with sufficient accuracy to enable the subsequent purchase of the album containing that selection.

The present invention provides an apparatus and methods for storing, broadcasting, receiving and displaying lyrics of music being simultaneously broadcast, including a real time indication of when each word or phrase of the lyrics is being sung in the accompanying musical broadcast.

The present invention also provides apparatus and methods for enabling a listener to rapidly and accurately identify broadcast musical selections.

The invention also provides apparatus and methods of storing selected musical selection identification information, and for recalling such information at a later time, to facilitate the purchase of the album containing that selection.

In order to make the broadcast of the lyric and identification material commercially feasible, the invention provides apparatus and methods for receiving and storing supplemental commercial text data substantially concurrently with the reception of audio commercial messages.

SUMMARY OF THE INVENTION

A broadcast system is provided which is compatible with conventional FM stereo receivers and which includes transmitter apparatus for transmitting audio musical selections and auxiliary data in the form of a digital message signal representing a text message which includes the name of the musical selection, name of the artist performing the selection, the name of the album on which the selection is located, the lyrics of the musical selection and timing data for synchronizing the lyrics with the music. The text message is transmitted either during, immediately prior to or immediately after the transmission of the musical selection.

Receiver apparatus receives the musical selection and the digital message signal. The musical selection is reproduced using loudspeakers and the like, and the message signal is decoded into the text messages which are displayed on a display substantially concurrent with the reproduction of the musical selection.

A user operated storage feature is provided for storing the displayed text message, and for recalling it for display at a later time. In another embodiment, the storage feature also stores a portion of the musical selection along with the text message identifying that selection. Upon recall, the stored musical selection is reproduced while the stored message is displayed. Multiple text messages and corresponding musical selections may be stored and recalled by user operation of multiple control switches, which may be the same control switches used in a conventional digitally tuned receiver for storing and recalling broadcast station frequencies.

A system for transmitting the auxiliary data is also disclosed where the musical selections and auxiliary data are transmitted as part of an FM stereophonic broadcast system in which a main carrier is transmitted at an assigned broadcast station frequency. An audio sum signal is provided representing the sum of the left and right channels of the stereophonic audio programs, and a double sideband suppressed carrier (DSBSC) signal is provided where the suppressed carrier is amplitude modulated by an audio difference signal representing the difference between the left and right channels of the stereophonic audio programs, the frequency of the suppressed carrier being such that the frequency spectra of the DSBSC signal is spaced apart from and is above the frequency spectra of the audio sum signal.

A stereo pilot subcarrier is provided to demodulate the DSBSC signal in receiver apparatus, where the frequency of the pilot subcarrier is a subharmonic of the DSBSC signal and is located between the frequency spectra of the audio sum signal and the DSBSC signal. Circuits are provided for amplitude modulating the stereo pilot subcarrier with the auxiliary data, and a modulator is used for frequency modulating the main carrier with the audio sum signal, the modulated stereo pilot subcarrier, and the DSBSC signal.

In one version of the above system, the auxiliary data is transmitted during the transmission of the stereo musical selections, and the stereo pilot subcarrier is amplitude modulated in a manner such that the frequency spectra of the modulated pilot does not overlap the frequency spectra of the audio sum signal or the frequency spectra of the DSBSC signal. When amplitude modulated with the auxiliary data, the stereo pilot subcarrier frequency modulates that main carrier from a minimum of 8% to a maximum of 10% of a predetermined maximum frequency modulation of the main carrier.

In another embodiment of the invention, the auxiliary data is transmitted during at least one time interval either before or after the transmission of the stereo musical selections. During that interval, which may be an interval of silence or in which audio announcements are transmitted, the left and right channels of the audio material being broadcast are set substantially equal to each other, forming a monophonic signal whereby the DSBSC signal is substantially unmodulated. The auxiliary data is transmitted during that interval by amplitude modulating the pilot subcarrier up to 100% with the auxiliary data, and the modulated subcarrier in turn frequency modulates that main carrier up to 30% of a predetermined maximum frequency modulation of the main carrier.

In another version of the above embodiment the auxiliary data is again transmitted during at least one monophonic time interval either before or after the transmission of the stereo musical selections, when the DSBSC signal is substantially unmodulated. In this version, the stereo pilot subcarrier is not modulated with the auxiliary data. Instead, the stereo pilot subcarrier is suppressed during the monophonic transmission interval, and an auxiliary data subcarrier is provided having a frequency greater than the frequency of the stereo pilot subcarrier and less than or equal to the highest frequency of the DSBSC signal spectra, and which is amplitude modulated by the auxiliary data. The auxiliary data subcarrier frequency may be set equal to the frequency of the DSBSC signal.

Also provided is a modulator for frequency modulating the main carrier with the audio sum signal, the stereo pilot subcarrier, the DSBSC signal, and the amplitude modulated auxiliary data subcarrier.

A receiver is disclosed for receiving the frequency modulated main carrier, and for using the amplitude modulation of the stereo pilot subcarrier (or the auxiliary data subcarrier) to provide the auxiliary data.

Also disclosed is a system for automatically providing an audio musical selection and a digital message signal representing a text message which includes the name of the musical selection, the name of the artist performing the selection, and the name of the album on which the selection appears. The system includes a compact disc player for playing a compact disc having multiple tracks each of which contains digitized musical data representing an audio musical selection.

The disc when played by the player provides, in addition to the audio musical selection, a track identification signal identifying the track being played and a disc identification signal which uniquely identifies the disc from other compact discs. A digital processor is provided with a memory having stored therein a table which includes the disc identification signal along with the name of the artist performing the musical selections on that disc and the name of the album on which the selection appears. The table also includes the names of the musical selections contained on that disc along with the track on which each selection is contained.

The processor is responsive to the disc identification signal and the track identification signal from the player and uses those signals in conjunction with the stored table for determining the name of the performing artist, the name of the album, and the name of the musical selection, and for combining these names to form the digital message signal.

A method of identifying broadcast audio program selections is disclosed which includes the steps of receiving a plurality of broadcast audio program selections which are reproduced by audio transducer means; receiving a plurality of broadcast text messages, where each text message is received substantially concurrent with and identifies a corresponding one of the audio program selections; temporarily storing a broadcast text message while it is being received, in a manner where each received text message replaces the previously temporarily stored text message; selecting in response to a user storage command a text message and a portion of the broadcast audio program identified by the selected text message to be stored in a fixed manner where it is retained until selected for deletion by user action; storing the selected text message and the selected portion of the broadcast audio program until it is selected for deletion by user action; providing a display for displaying a text message; recalling the selected text message in response to a user recall command; and displaying the recalled message on the display.

A method for transmitting a plurality of stereophonic audio programs and auxiliary data is disclosed which includes the steps of transmitting a main carrier at an assigned broadcast station frequency; providing an audio sum signal representing the sum of the left and right channels of the stereophonic audio programs; providing double sideband suppressed carrier (DSBSC) signal, where the suppressed carrier is amplitude modulated by an audio difference signal representing the difference between the left and right channels of the stereophonic audio programs, the frequency of the suppressed carrier being such that the frequency spectra of the DSBSC signal is spaced apart from and is above the frequency spectra of the audio sum signal; providing a stereo pilot subcarrier to be used to demodulate the DSBSC signal in receiver apparatus, where the frequency of the pilot subcarrier is a subharmonic of the DSBSC suppressed carrier and is located between the frequency spectra of the audio sum signal and the DSBSC signal; amplitude modulating the stereo pilot subcarrier with the auxiliary data; and frequency modulating the main carrier with the audio sum signal, the modulated stereo pilot subcarrier, and the DSBSC signal.

Another method is disclosed for stereophonically transmitting a series of stereophonic audio programs comprised of left and right channels, and auxiliary data, including the steps of providing monophonic intervals spaced between stereophonic audio programs, where the left and right channels are substantially equal; transmitting a main carrier at an assigned broadcast station frequency; providing an audio sum signal representing the sum of the left and right channels of the stereophonic audio programs; providing a double sideband suppressed carrier (DSBSC) signal, where the suppressed carrier is amplitude modulated by an audio difference signal representing the difference between the left and right channels of the stereophonic audio programs, the frequency of the suppressed carrier being such that the frequency spectra of the DSBSC signal is spaced apart from and is above the frequency spectra of the audio sum signal; providing during stereophonic transmissions a stereo pilot subcarrier to be used to demodulate the DSBSC signal in receiver apparatus, where the frequency of the pilot subcarrier is a subharmonic of the DSBSC signal frequency and is located between the frequency spectra of the audio sum signal and the DSBSC signal; suppressing the stereo pilot subcarrier during at least one monophonic interval; providing during the at least one monophonic interval an auxiliary data subcarrier having a frequency greater than the frequency of the pilot subcarrier and less than or equal to the highest frequency of the DSBSC signal spectra; amplitude modulating the auxiliary data subcarrier by the auxiliary data; and frequency modulating the main carrier with the audio sum signal, the stereo pilot subcarrier, the DSBSC signal, and the amplitude modulated auxiliary data subcarrier.

Also disclosed is a method of identifying audio broadcast programs, including the steps of: providing an audio musical selection; providing a digital message signal representing a text message which includes the name of the musical section and the name of the artist performing the selection; transmitting the digital message signal and the audio musical program, where the digital message signal is transmitted substantially concurrent with the transmission of the audio musical selection; receiving the audio musical selection and the digital message signal; decoding the digital message signal into the text message; reproducing the audio selection using audio transducer means; and displaying the text message substantially concurrent with the reproduction of the musical selection.

A system for storing, broadcasting, receiving and displaying lyrics of music substantially simultaneously with the broadcast of the audio music itself is also disclosed. Phrases of lyrics are broadcast, received and displayed just before or as the phrases of lyrics occur in the accompanying music. Further, once a phrase is displayed individual words or lines of the phrase are highlighted as the particular word or line occurs in the accompanying music. Several systems and methods for creating the lyric and timing data necessary for the broadcasting, display and highlighting of lyrics is also disclosed.

The system also provides for preparing, broadcasting, receiving and displaying supplemental text provided by advertisers. The supplemental advertising text is broadcast and displayed substantially simultaneously with the broadcast of a corresponding audio commercial message. This supplemental advertising text can be output to a printer or stored in memory by a user for later reference.

These and other objects, features and advantages of the invention will become apparent from a reading of the specification when taken in conjunction with the drawings on which like reference numerals refer to like elements in the several figures.

BRIEF DESCRIPTION OF THE DRAWINGS

FIG. 5 is a graph showing the frequency spectra and relative modulation levels of the main station carrier in response to the carrier signals transmitted by the transmitter of FIG. 1 within the broadcast channel of an FM stereo broadcast station in accordance with a second embodiment of the invention which transmits auxiliary digital data during periods of monophonic audio transmission;

FIG. 6 is a graph showing the pulse amplitude modulation of the stereo pilot carrier in the time domain when used to transmit auxiliary digital data in accordance with the second embodiment of the invention;

FIG. 12 is a block schematic of a lyric receiver and display unit.

FIG. 13 is a block diagram of a system for creating files that store both lyrics and lyric timing data.

FIG. 16 is a block diagram showing a system for decoding and broadcasting the digital data embedded onto a tape cartridge according to the system of FIG. 15.

BRIEF DESCRIPTION OF THE PREFERRED EMBODIMENT

Several prior art systems have been developed for use with conventional FM stereo broadcast systems for the transmission and reception of data (hereinafter referred to as auxiliary data) which is not a part of the regularly broadcast stereophonic audio programs. In general, these systems employ one or more subcarriers which are transmitted in a subcarrier band (generally referred to as the SCA band) which lies above the 53 kHz portion of the station bandwidth allocated to the transmission of conventional stereo audio signals. A variety of techniques are used to modulate these subcarriers to transmit auxiliary data which may be in the form of additional audio programs, or special announcements such as traffic conditions.

Examples of the above described systems are disclosed in U.S. Pat. Nos. 3,949,401; 4,435,843; 4,450,589 and 4,584,708, all assigned to Blaupunkt-Werke GmbH; and U.S. Pat. Nos. 4,252,995; 4,393,273; and 4,538,285, all assigned to U.S. Philips Corporation.

One drawback in these prior art auxiliary data transmission systems is that by using the SCA band for such use, they preclude the broadcast station from using that band for other uses such as the broadcast of background music, foreign languages, financial data, and the like, all of which can provide substantial additional income to the station. Further, the use of this band poses substantial technical problems due to the low frequency modulation limits imposed for this band by FCC regulations, and due to the relatively high FM modulation frequencies required to operate in this band. These limitations result in a low signal-to-noise ratio, requiring complicated and expensive modulation and noise reduction circuitry. As shown below, the present invention overcomes these problems by using the stereo audio portion of the station broadcast band for transmission of the auxiliary data.

Figure 1:
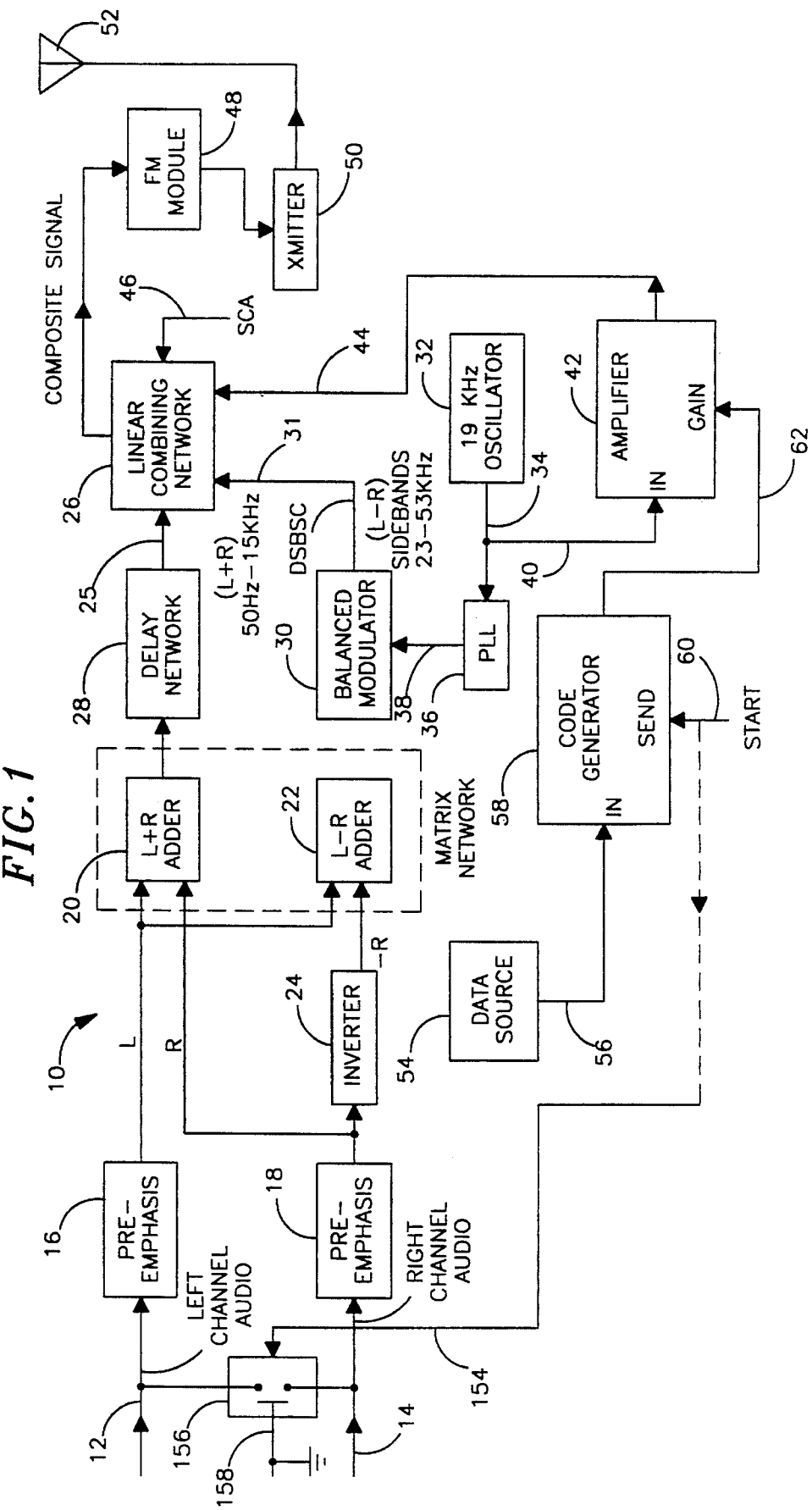
FIG. 1 is a functional block diagram of an FM stereo transmitter system constructed in accordance with the invention showing pulse amplitude modulation of the stereo pilot subcarrier to broadcast auxiliary digital data in addition to audio program material.

Referring to FIG. 1, there is shown a functional block diagram of an FM stereo transmitter system 10 constructed in accordance with the teachings of the invention. Left and right channel audio signals from a stereophonic audio source (such as a compact disc player or microphone) are provided on lines 12 and 14 to pre-emphasis networks 16 and 18, respectively. These networks add pre-emphasis and limit signal bandwidth to 50 Hz–15 kHz.

The signal from the network 16 is provided to an input terminal of adders 20 and 22 (which form part of a matrix network), while the signal from the network 18 is provided to an input terminal of adder 20 and, through an inverter 24, to an input terminal of adder 22. The signal from the adder 20, representing a monaural signal in the form of the sum (L+R) of the left and right audio channels is provided on line 25 to an input terminal of a linear combining network 26 through a delay network 28. The signal from the adder 22, representing the difference (L−R) of the left and right audio channels, is provided to the input terminal of a balanced modulator 30. The output signal from the modulator 30 which, as described below, is in the form of a double sideband suppressed carrier (DSBSC) signal, is provided on line 31 to a second input terminal of the combining network 26.

A 19 kHz oscillator 32 provides a 19 kHz stereo pilot signal on line 34 to a phase locked loop (PLL) circuit 36 which uses the pilot signal to generate a phase synchronized 38 kHz signal on line 38. The signal on line 38 is provided as a carrier signal to the modulator 30 which, in a well known manner, generates the DSBSC signal having a suppressed carrier at 38 kHz which is amplitude modulated by the L−R signal to form upper and lower sidebands, each having a 15 kHz bandwidth. Thus, the frequency spectra of the DSBSC signal extends from 23 to 53 kHz. The stereo pilot is used in receiver apparatus described below to demodulate the DSBSC signal.

The 19 kHz signal from the oscillator 32 is provided on line 40 to the input terminal of a variable gain amplifier 42, the output signal of which is provided as a stereo pilot subcarrier on line 44 to a third input terminal of the combining network 26. An optional SCA (Subsidiary Communications Authorization) signal is provided on line 46 to a fourth input terminal of the network 26. The SCA signal may include background music, foreign language, financial data and other generally commercial-free programming materials which are broadcast to subscribers having special receivers. The SCA band is generally limited to the 59.5 to 74.5 kHz portion of the broadcast channel.

The output signal from the combining network 26 is provided to an FM modulator 48 which is used to frequency modulate a main carrier provided by transmitter 50 to antenna 52 at the assigned broadcast station frequency. The combining network 26 is used in part to set the FM modulation levels produced by the various input signals. In accordance with the teachings of the invention, the gain settings of the variable gain amplifier 42 also affect the FM modulation levels produced by the 19 kHz stereo pilot subcarrier as described below.

FM broadcast station frequencies in the United States are in the band from 88 to 108 MHz. Each station is allocated a 200 kHz wide channel, and FM modulation levels of the various broadcast signals are referenced as a percent of a 75 kHz frequency deviation, which is defined as the 100%, or maximum, FM modulation level. Hereinafter, references to FM signal percent modulation levels are with respect to this 100% level.

Figure 2:
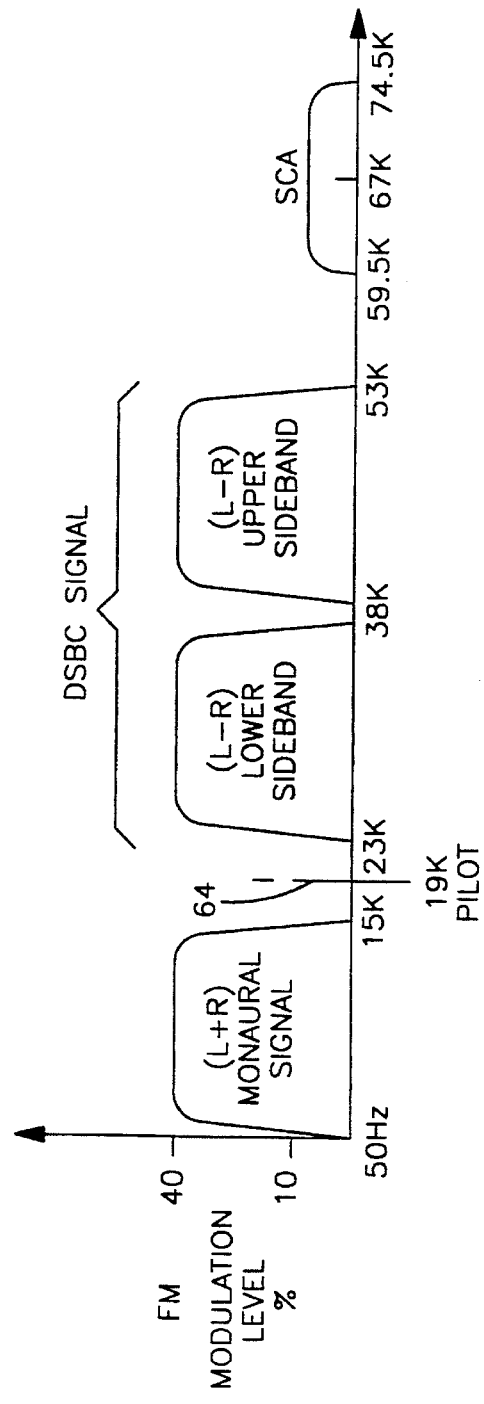
FIG. 2 is a graph showing the frequency spectra and relative modulation levels of the main station carrier in response to the various signals transmitted by the transmitter of FIG. 1 within the broadcast channel of an FM stereo broadcast station in accordance with a first embodiment of the invention.

The portion of the transmitter system 10 described thus far (excepting the operation of the variable gain amplifier 42) represents a conventional FM stereo broadcast system well known to those skilled in the art. FIG. 2 is a graph showing the frequency spectra and relative FM modulation levels (%) of the main carrier produced by the various signals previously described. The L+R monaural signal from line 25 of FIG. 1 occupies the 50 Hz to 15 kHz spectra and FM modulates the main carrier up to a level of about 40%. The 19 kHz stereo pilot subcarrier FM modulates the main carrier at a nominal level of 9%, and is constrained by FCC regulations to the range of 8–10% during stereo broadcasts. The DSBSC Signal from the line 31 of FIG. 1 occupies the 23–53 kHz spectra (±15 kHz about the 38 kHz suppressed carrier), and FM modulates the main carrier up to a level of about 40% during stereophonic broadcasts. The SCA signal from the line 46 occupies the 59.5–74.5 kHz spectra, and FM modulates the main carrier up to a level of about 10%.

Returning to FIG. 1, the following components are added to the conventional transmitter system described above to enable the broadcast of auxiliary digital data used to identify musical selections. A data source 54 is provided which produces a signal on line 56 which identifies a particular stereophonic musical selection provided on lines 12 and 14 for broadcast. The signal on line 56, which is preferably a digital signal, is provided to an input terminal of a code generator 58, the purpose of which is to arrange the input signal into a text message in the form of a pulse code sequence where the pulses are of a predetermined amplitude and frequency.

In response to a start signal appearing on line 60, the code generator 58 provides the pulse code sequence on line 62 to a gain control input terminal of amplifier 42. The amplifier 42 responds to the gain control signal by varying the amplitude of the 19 kHz signal provided on line 44 to the network 26. In effect, the pulse code sequence on line 62 in conjunction with amplifier 42 provides pulse amplitude modulation (PAM) of the broadcast stereo pilot subcarrier.

Preferably, the text message is broadcast substantially concurrent with the broadcast of the musical selection which it identifies. The term "substantially concurrent" as used herein is meant to include substantially immediately prior to, during, or substantially immediately after the broadcast of the musical selection. By way of example but not limitation, the signal provided on line 56 by the data source 54 includes three items of information: the title, the name of the performing artist, and the name of the album corresponding to the musical selection to be identified. The generator 58 arranges this information into the form of a three-line text message suitable for display on three lines of a digital display which is included in receiver circuits described below.

By way of further example, each of the three items of information is allocated 24 characters. A six-bit ASCII code may be used to represent the characters, for a total of 432 character bits. Adding additional bits for start-of-message (SOM), end-of-message (EOM), carriage return, and error correction codes results in a requirements for about 500 bits of information to represent the entire message. Using pulse amplitude modulation of the stereo pilot subcarrier, these 500 bits are transmitted by the system 10 using 250 pulse code cycles as follows.

The steady-state gain of the amplifier 42 in the absence of a gain signal on the line 62 is set so that the 19 kHz stereo pilot signal on the line 44 FM modulates the main carrier at a 9% modulation level. In response to the start signal on the line 60, the generator 58 provides a sequence of pulses on the line 62 which represent the message corresponding to the data from the source 54. The pulse sequence preferably begins with an SOM code word, and ends with an EOM code word. The pulses, which are preferably in the form of binary ones and zeros, act to vary the gain of the amplifier 42, and thus the amplitude of the signal 44, whereby the stereo pilot signal FM modulates the main carrier in the range of 8 to 10% in response to these pulses. This modulation envelope is shown in the frequency spectra by dotted line 64 in FIG. 2, and is shown in the time domain by the graph of FIG. 3.

Figure 3:
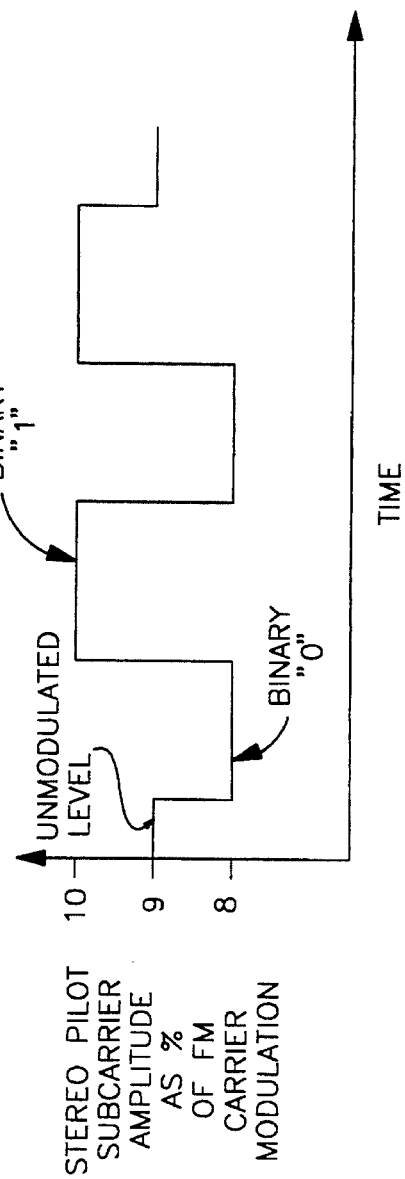
FIG. 3 is a graph showing the pulse amplitude modulation of the stereo pilot carrier in the time domain when used to transmit auxiliary digital data in accordance with the first embodiment of the invention.

In FIG. 3, the amplitude of the stereo pilot signal is shown as decreasing from a 9% FM modulation level to 8% in response to a pulse on the line 62 representing a binary zero, and increasing to a 10% level in response to a pulse on the line 62 representing a binary one. Accordingly, the pulses act to amplitude modulate the stereo pilot by an amount of about 11% AM modulation. The repetition rate at which the pulse sequence is provided on the line 62 is determined in part by the timing relationship between the broadcast of a musical selection and the broadcast of the message identifying that selection, as follows.

It is presumed that the broadcast station transmits a plurality of stereophonic musical selections which are separated from each other by an interval of silence of about one second or more, or are separated by audio announcements of much longer duration. The duration of most musical selections is generally one minute or more.

One protocol for broadcasting the digital message is to transmit it during the time the corresponding musical selection is being transmitted, where the message transmission begins at about the same time as the musical selection transmission begins. Using this protocol, it is desirable to minimize the AM modulation frequency of the stereo pilot signal to avoid AM sideband disturbance to receiver circuits (described below) which use that signal to demodulate the L−R signal. This can be accomplished by transmitting the message at a low data rate over an interval of, for example, 25 seconds. This interval is sufficiently short to permit the entire message to be transmitted before the end of the musical selection which it identifies. The 25 second interval yields a pulse rate of 10 Hz to transmit the 250 pulse cycles constituting the message. It is envisioned that this low frequency will not interfere with conventional receiver operation relating to stereophonic signal reception.

Another protocol for broadcasting the digital message is to transmit it during the interval of silence immediately preceding or following the musical selection to be identified. Using this protocol, it is envisioned that the message would be transmitted within approximately one second. A higher message transmission data rate can be used during this interval of silence because minor disturbances in the demodulation function of the stereo pilot signal in the receiver can be tolerated due to the fact that no audio signals are being received.

From FIG. 2, it will be seen that the stereo pilot is separated from the audio signals by a 4 kHz band, and it is desirable to keep the stereo pilot AM sidebands well within this band between the L+R and L−R signal spectra to avoid spurious tone generation in the receiver. Accordingly, a pulse repetition rate of, for example, 1 kHz may be chosen to transmit the digital message in 250 milliseconds, which is well within the interval of silence.

Figure 4:
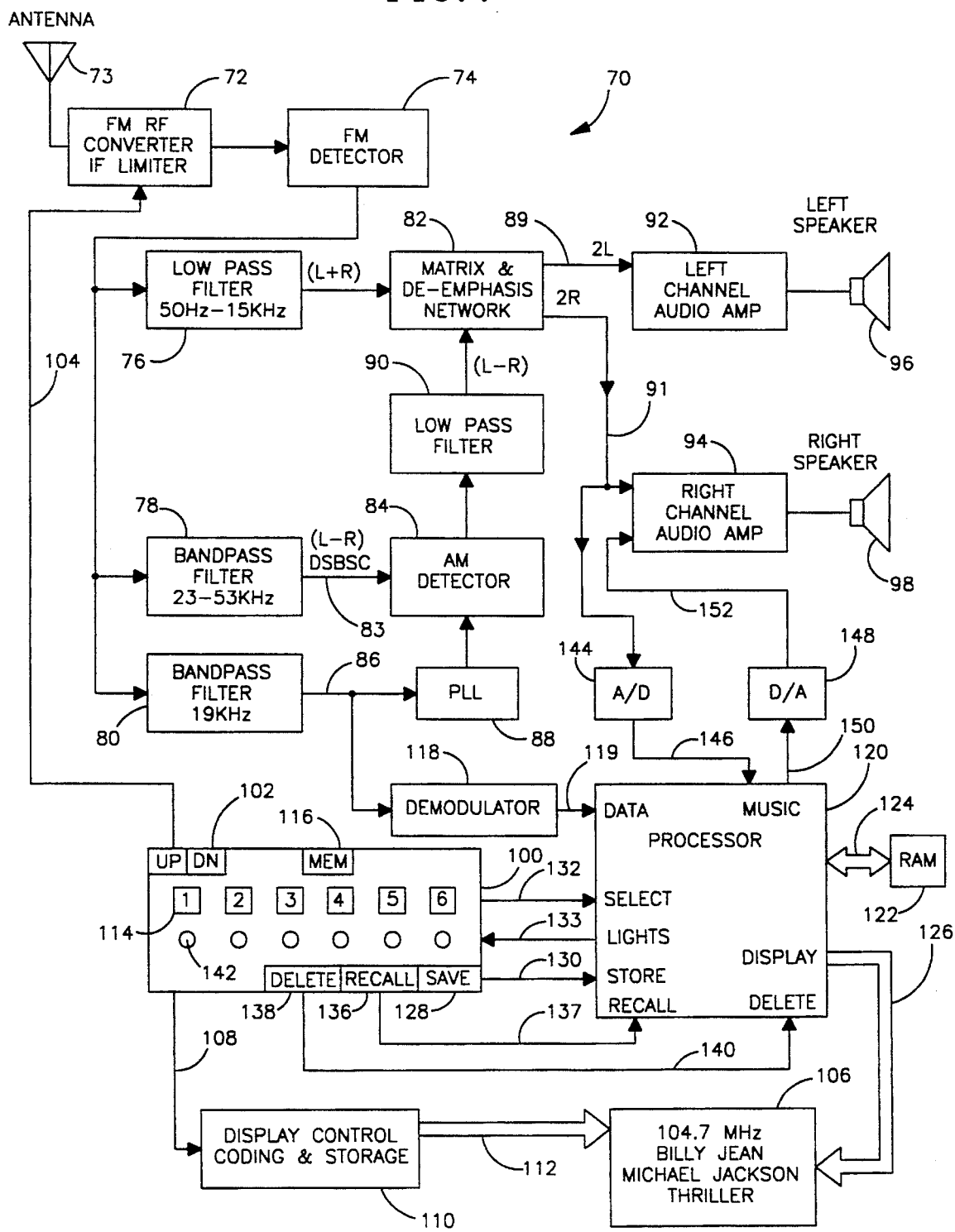
FIG. 4 is a functional block diagram of an FM stereo receiver constructed in accordance with the invention for receiving, displaying, storing and recalling the auxiliary digital data transmitted by the transmitter of FIG. 1.

Referring now to FIG. 4, there is shown a receiver system 70 which may be used to receive the stereophonic audio broadcasts as Well as the digital message signals transmitted by the transmitter system 10. The system 70 includes conventional RF amplifiers, converter, IF amplifiers and limiter, (all shown in block 72) for receiving FM signals via antenna 73 in a standard FM receiver. The output signal from the block 72 is provided to an FM detector 74, the output of which is provided to filters 76, 78, and 80. The filter 76 is a 50 Hz–15 kHz low pass filter for extracting the monaural L+R signal from the received composite signal. The L+R signal is provided to an input terminal of a matrix and de-emphasis network 82.

The filter 78 is a 23–53 kHz bandpass filter for extracting the DSBSC L−R signal from the received composite signal. The L−R signal is provided on line 83 to a signal input terminal of an AM detector 84. The filter 80 is a 19 kHz bandpass filter for extracting the stereo pilot signal from the received composite signal. The pilot signal is provided on line 86 to a phase locked loop (PLL) 88. In response thereto, the PLL 88 provides a 38 kHz signal which is synchronized to the phase of the pilot signal.

This 38 kHz signal is provided to a carrier input terminal of the AM detector 84. The output signal from the detector 84 is provided, through low pass filter 90 to another input terminal of the network 82. Output signals from the network 82 are provided to left and right channel audio amplifiers 92 and 94, respectively. Output signals from the amplifiers 92, 94 are used to drive audio transducers, which may be in the form of loudspeakers 96 and 98, respectfully.

A control panel 100 is provided which includes a variety of user operated controls including digital tuning controls. An up/down tuning switch 102 is used to change the tuning frequency of the receiver by providing a tuning signal on line 104 which is used to control the RF and converter circuits in the block 72 in the well known manner of a superheterodyne receiver. The switch 102 enables the user to scan up or down the FM band to select a desired broadcast station frequency.

The frequency to which the receiver is tuned is shown on a display 106 (which may be of the liquid crystal type) by providing a suitable frequency indicating signal on line 108 to an input terminal of display control, coding and storage circuits 110. The circuits 110 are used to code the incoming signals into display characters, and to store those characters until they are replaced by new ones in response to a change in the incoming signal. The stored characters are provided to the display 106 on bus 112. The display in FIG. 4 shows the receiver tuned to 104.7 MHz.

In addition to the switch 102, the panel 100 includes a plurality of switches 114 (labeled 1 through 5 in the Figure) which are used in conjunction with a memory switch 116 to store often used station frequencies. Storage is accomplished by tuning the receiver to the desired frequency using the switch 102, pressing the memory switch 116, and then pressing one of the switches 114. These steps act to store the tuned frequency in a storage location corresponding to the particular switch 114 actuated. Future actuation of the switches 114 acts to recall the previously stored station frequency, which is displayed on the display 106 and used to tune the receiver 70.

The operation of the receiver circuits described thus far for the reception of stereophonic audio signals is as follows. The receiver is tuned to the desired station frequency using the switches 102 or 114 as described above. The received signal is processed by the circuits 72 and 74, and separated by the filters 76, 78 and 80 into the L+R, L−R and stereo pilot signals, respectively. The stereo pilot signal is used to reconstruct the 38 kHz subcarrier, which is used by the AM detector 84 to demodulate the L−R signal. The L+R and L−R audio signals are combined by the matrix network 82 to form left and right audio signals on lines 89 and 91, which are amplified and reproduced by the elements 92, 94, 96 and 98 to produce stereophonic sound. The presence of the stereo pilot signal may be used to illuminate a stereo indicator light (not shown).

If the broadcast station is transmitting monophonically, the stereo pilot signal is generally not transmitted. In this event, the stereo indicator is extinguished, no L−R signal is present, and the matrix network 82 provides the monophonic L+R signal to the amplifiers and speakers to reproduce monophonic sound.

The receiver system 70 also receives and processes the auxiliary data (in the form of a digital message signal) transmitted by the system 10 as described above to identify musical selections broadcast and reproduced substantially concurrently therewith. This is accomplished by an amplitude demodulator 118 which receives at its input terminal from the filter 80 the stereo pilot signal, which is pulse amplitude modulated (PAM) with the digital message signal. The bandwidth of the filter 80 is set sufficiently wide to accommodate the PAM sidebands, which may typically range from 10 Hz to 1 kHz, depending on the procedure used in broadcasting the message, as described above. Alternatively, a separate 19 kHz bandpass filter (not shown) may be employed between the detector 74 and the demodulator 118, if it is desired to maintain a very narrow bandwidth for the filter 80 in connection with the operation of the PLL 88.

The demodulator 118 may be configured in a variety of ways, one example of which is shown in Figure 4.2.23 of the textbook entitled "Digital Communications", written by John G. Proakis, McGraw-Hill, 1983. The output signal from the demodulator 118, which contains the pulse sequence representing the digital message, is provided on line 119 to a data input terminal of a digital processor 120, which is preferably in the form of a microprocessor. A non-volatile random access memory 122 is also connected to the processor 120 via bus 124. The memory 122 is of the type which retains data stored therein even upon removal of power from the remaining receiver circuits, using any of a plurality of well known techniques.

Upon receipt of an SOM code word on the line 119, the processor 120 begins storing the message in a temporary storage area which may be a part of the processor 120. This area is labeled temporary because subsequent received messages are automatically stored therein in place of previously received messages, as described below. Upon receipt of an EOM code word on the line 119, the processor 120 provides the message, corrected for errors using suitable error correction techniques, to the display 106 via a display output terminal and bus 126.

The display 106 is configured with four display lines. One line is used as described above to display tuning frequency in response to data from the circuits 110, which are preferably included as part of the processor 120. The additional three display lines are used to display the musical selection title, artist and album, respectively, in response to the signals on the bus 126. Upon receipt of a subsequent SOM code word, the processor 120 clears the temporary storage area and the three lines of the display, temporarily stores the new message in place of the previous message, and upon receipt of an EOM code word, displays that new message. Alternatively, incoming messages may be displayed as they are being received, as opposed to being displayed after they are received.

From the above description, it may be seen that the receiver system 70 displays to the user a message identifying a musical selection broadcast and reproduced by the speakers 96, 98 substantially concurrent therewith. Further, the system 10 used to transmit the message is compatible with existing FM stereo receivers in that it does not disturb the reception and processing of the stereophonic audio signals. This is so because such receivers are, for the most part, insensitive to the amplitude modulation of the stereo pilot signal within the limits described above. For example, while the PLL 88 uses the phase information from the received stereo pilot to reconstitute the 38 kHz carrier, it is relatively unaffected by amplitude changes in the pilot signal.

One limitation in the system 70 described above is that the user must observe the display 106 during the reception of the musical selection associated therewith in order to note the identifying information. First, this limitation poses a problem in automobile radios, where such action disrupts the drivers attention. Second, this limitation requires that the user remember or note in writing the identifying information if the intention is to purchase at a later time the album containing that selection.

This limitation is overcome in the present invention by providing a fixed storage function for storing selected messages for recall at a later time in response to user action. Thus, a SAVE button 128 is provided on the control panel 100, the actuation of which provides a store signal to an input terminal of the controller 120 via line 130. In response to this signal, the controller 120 acts to store the displayed message in a non-volatile portion of the memory 122 for later recall by the user. Multiple messages may be saved in this manner by combining the function of the switch 128 with the switches 114 as follows.

In order to save a message, the user actuates the SAVE switch 128 followed by one of the switches 114 used for storing and recalling station frequencies, as described above. Using this sequence of switch actuations, the processor 120 receives a select signal on line 132 representing a particular one of the switches 114 thus actuated, in addition to the store signal on the line 130. In response thereto, the processor 120 stores the displayed message in a memory location whose address correlates with the particular switch 114 actuated.

Thus, in the configuration shown, up to five separate messages may be stored by the user in separate locations in the memory 122. More messages may be accommodated by providing additional switches 114 on the panel 100. To recall a particular message at a later time, the user actuates a RECALL switch 136 provided on the panel 100, followed by the actuation of one of the switches 114. This action causes the processor 120, in response to a recall signal provided on line 136, and a select signal on line 132, to recall the selected message previously stored in the memory 122, and to display that message on the display 106.

Such stored messages may be repeatedly recalled until deleted by the user. Deletion is accomplished by actuation a delete switch 138 provided on the panel 100, followed by actuation of one of the switches 114. This action causes the processor 120, in response to a delete signal provided on line 140 and a select signal on line 132, to delete from the memory 122 the selected message.

Indicator lights 142 may be provided on the panel 100 adjacent each switch 114 to indicate which switch locations have messages stored in conjunction therewith. Thus, the user can see which locations are free for storage of additional messages. The lights 142 are controlled by the processor 120 via line 133. Further, an audio tone can be provided by the processor 120 to alert the user in the event a location is chosen for storage of a new message and that location already contains a previously stored message. In response to that tone, the user can select another location, or delete the previously stored message from that location. This procedure eliminates the accidental deletion of a previously stored message. The use of an audio tone also eliminates the need for the user to look at the display panel prior to storing messages. A suitable switching arrangement (not shown) can be implemented to suppress the display of incoming messages during the time when previously stored messages are being recalled.

It will be appreciated that the features described above eliminate the need for the user to memorize or note in writing messages of interest. They can be selected and stored, and then recalled and displayed at a later time such as just prior to purchase of the album. There are occasions, however, when upon later recall of a message, the user can no longer remember the melody and/or lyrics of the musical selection associated with that message. This is particularly true when a plurality of messages have been stored.

To overcome this problem, the system 70 includes apparatus for storing a portion of the musical selection along with the message identifying that selection. Referring to FIG. 4, an analog to digital (A/D) converter 144 is provided having an input terminal connected to, for example, line 91 to receive audio signals from one (left or right) of the stereophonic channels provided by the network 82. A digital output signal representing the received audio program is provided by A/D converter 144 on line 146 to a music input terminal of the processor 120. A digital to analog (D/A) converter 148 is provided having an input terminal connected via line 150 to a music output terminal of the processor 120, and having an analog output signal terminal connected via line 152 to a second audio input terminal of the amplifier 94.

The operation of this portion of the system 70 is as follows. Upon listening to a musical selection reproduced by the system 70, if the listener desires to save information concerning that selection, the switches 128 and 114 are actuated as described above. In response thereto, the processor substantially immediately begins storing in the non-volatile portion of the memory 122 the digital signals received on line 146 from converter 144, and continues the storage of such signals for a predetermined interval of time, for example, ten seconds. The processor also stores in an associated portion of the memory 122 the message corresponding to that musical selection. As stated above, the digital signals on the line 146 are a representation of the audio selection being broadcast. It has been found that ten seconds is generally a sufficient interval of time to enable the user to identify the lyrics and/or the melody of most musical selections.

Upon recall of the stored information using switches 136 and 114, the processor 120 provides the stored message to the display 106 and substantially simultaneously provides the digital signals previously stored from the converter 144 to the input terminal of the converter 148 on the line 150. The converter 148 converts these signals to an analog signal representing ten seconds of the musical selection, which are amplified by the amplifier 94 and reproduced by the speaker 98. In this manner, the user is able to recall both a portion of the musical selection and the message identifying that selection. Multiple such selections/messages may be stored, recalled and deleted using the switches 128, 136, and 138 in conjunction with the plurality of switches 114 as described above. A suitable switching arrangement (not shown) can be implemented to suppress the audio reproduction of received signals from the network 82 during the playback of the stored audio signals from the processor 120.

Three protocols were discussed in connection with the transmitter system 10 relating to the timing of the broadcast of messages with respect to the broadcast of the musical selections associated therewith. These protocols included the broadcast of the message during, prior to, and subsequent to the broadcast of the associated musical selection. It is presumed that when the message is broadcast during the broadcast of the musical selection, the broadcast of the message begins substantially at the beginning of the broadcast of the musical selection it identifies. The manner in which the receiver system 70 associates and stores received messages in conjunction with musical selections is related to the particular protocol selected for use with the transmitter system 10, as follows.

If the selected protocol is one where the message is broadcast prior to the broadcast of the associated musical selection, the processor 120 is configured to store the message contained in the temporary storage area, along with the portion of the selected musical selection.

If the selected protocol is one where the message is broadcast during the broadcast of the associated musical selection, the processor 120 is configured such that it stores the portion of the selected musical selection, and scans the temporary storage area for an EOM code. If one is found, this indicates that the desired message has been received in its entirety (recall that the processor 120 clears the temporary storage area upon receipt of an SOM code), and that message is stored in non-volatile memory in association with the stored musical selection. If no EOM code is found, the processor waits until such a code is received, and then stores that message in non-volatile memory in association with the stored musical selection.

If the selected protocol is one where the message is broadcast after the broadcast of the associated musical selection, the processor 120 is configured such that it clears the temporary storage area prior to storing the portion of the selected musical selection, and then scans that storage area for a newly received EOM code. When that code is received, the message stored in the temporary area is stored in the non-volatile area in association with the stored musical selection.

While a first embodiment of the invention has been disclosed, modifications and additions of the invention has been disclosed, modifications and additions can be made to provide additional features. A second embodiment of the invention is provided in which the auxiliary data in the form of a digital text message is transmitted during periods of monophonic audio transmission to enable the use of higher levels of modulation for the transmission of such data.

As described above, the broadcast station transmits a plurality of stereophonic musical selections which are separated from each other by an interval of silence of about one second or more, or are separated by audio announcements of much longer duration. In this second embodiment, the broadcast mode during the intervals of silence or audio announcements is converted to monophonic transmission as follows, where it is presumed for the purpose of example that the message broadcast protocol used is that of broadcasting the message just prior to the associated musical selection.

Returning to FIG. 1, the start signal for instituting the transmission of the auxiliary data is provided on the line 60 during the interval of silence or audio announcement just prior to the stereophonic broadcast of the musical selection identified by that data. That start signal is also provided on line 154 to actuate a switch 156 which acts to connect together the left and right audio input lines 12 and 14. The effect of this connection is to convert the signals from the audio source to the monophonic signal, where the left and right channels are equal. In the case where the interval prior to the broadcast of the musical selection includes an audio announcement, the audio source may be a microphone or pre-recorded source. In the case where the interval is one of silence, there is no signal on the lines 12 and 14, and the switch 156 may additionally ground these two lines using line 158, to ensure null signals on these audio lines.

It will be appreciated that setting the signals on the lines 12 and 14 equal to each other reduces the L–R signal from the adder 22 (and hence the DSBSC signal on the line 31) to zero. Accordingly, the stereo pilot signal on the line 40 is not needed for purposes of receiver stereo demodulation during this interval. As a result, both the unmodulated amplitude and the level of AM modulation of the stereo pilot carrier may be increased over those levels used during stereophonic transmission.

For example, the amplitude of the unmodulated pilot can be increased by amplifier 42 to a value where it FM modulates the main carrier at a 20% level as opposed to the 9% level used during stereo broadcast. Further, the level of AM modulation of the pilot can be increased to say, 50% of the pilot signal (corresponding to an FM modulation range of 10 to 30% of the main carrier), as opposed to the 11% level (corresponding to an FM modulation range of 8 to 10% of the main carrier) used during stereo broadcast.

The effects of these changes during monophonic broadcasting are shown in the frequency spectrum by the graph of FIG. 5, which may be compared to FIG. 2. Note the absence of the DSBSC signal, and the increase in amplitude and FM modulation levels (line 168) of the stereo pilot subcarrier. These stereo pilot signal modulation effects are shown in the time domain by the graph of FIG. 6, which may be compared to FIG. 3. These changes are accomplished by providing a steady state bias signal on the line 62 which boosts the unmodulated pilot subcarrier amplitude to the desired level during monophonic operation, and providing the pulses representing the digital message in sufficient amplitude to provide the desired AM modulation level of the pilot. The result of these changes is to provide a much higher signal-to-noise level in the transmission of the auxiliary data, as compared to the first embodiment. These changes do not adversely affect the operation of conventional FM stereo receivers, since the stereo pilot is not used or required for reception of monophonic broadcasts.

While particular amplitude and modulation levels have been described in relation to the stereo pilot in this configuration, it is contemplated that other levels may be used as well. For example, the unmodulated level of the stereo pilot could be further increased to effect a 30% FM modulation level of the main carrier, and the AM modulation level may be increased up to 100% of the pilot signal.

At the completion of the broadcast of the auxiliary data, which occurs within the monophonic interval, the start signal is removed, and the transmission reverts back to stereophonic, whereby the musical selection is broadcast. This same technique can be used with the protocol where the message is broadcast in the interval following the musical selection which it identifies.

Figure 7:
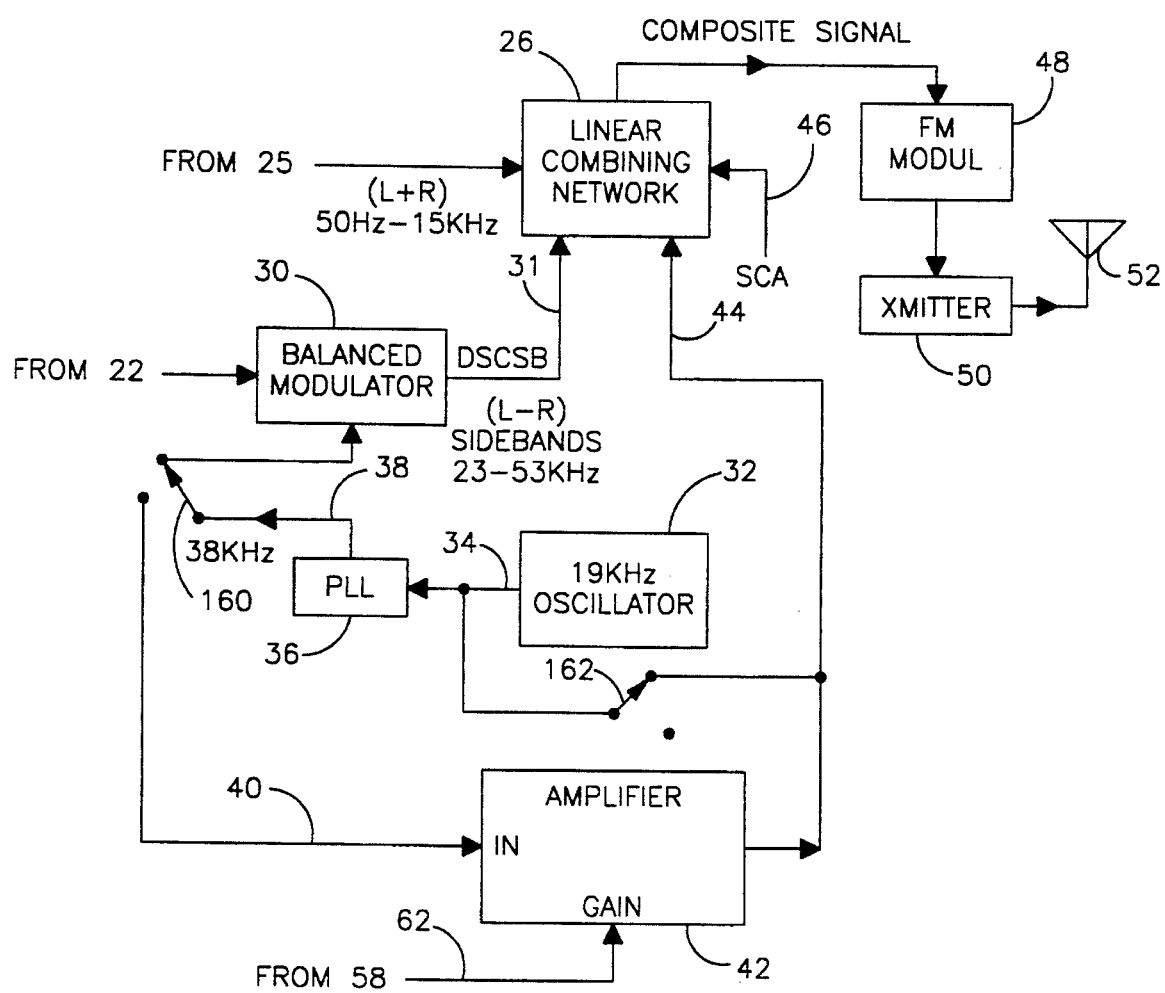
FIG. 7 is a functional block diagram showing a modification of the transmitter of FIG. 1 to pulse amplitude modulate a 38 kHz auxiliary data subcarrier to transmit auxiliary digital data during monophonic audio transmission.

In a modification of this embodiment, auxiliary data is again broadcast during monophonic transmission intervals, but the stereo pilot subcarrier is not used for this purpose. Instead, the 38 kHz subcarrier generated by the PLL 38 is transmitted in place of the stereo pilot (the transmission of which is suppressed), and its AM modulated with the auxiliary data. FIG. 7 shows the modifications to the system 10 to accomplish this objective. The start signal on the line 60 in FIG. 1 is used as described above to start the pulse code generation by the generator 58 and to actuate the switch 156 to set the audio channels 12 and 14 equal to each other. In addition, this signal is used to control switches 160 and 162 in FIG. 7 as follows.

The switch 160 is actuated to divert the 38 kHz carrier from the modulator 30 to the input terminal of the amplifier 42 via the line 40. The switch 162 is actuated to disconnect the stereo pilot signal from the network 26. In this configuration, the stereo pilot is not broadcast, and the DSBSC signal on the line 31 is a null signal as a result of the actuation of the switch 156. The 38 kHz signal on the line 40 is AM modulated by the amplifier 42 in response to the signal from the generator 58 on the line 62, and the resultant signal is provided via the line 44 to the network 26 from where it is used as a subcarrier to FM modulate the main carrier.

The dotted line 164 in FIG. 5 shows the presence of the 38 kHz subcarrier in the frequency spectrum of the main carrier during monophonic broadcasting, while the stereo pilot subcarrier (line 168) would not be present during this time. Since the 38 kHz subcarrier is not needed as a suppressed carrier for the DSBSC signal during monophonic broadcasts, it may be broadcast in place of the stereo pilot subcarrier, which is suppressed, and its amplitude and AM modulation levels may be set over a wide range of the signals from the generator 58 in conjunction with the amplifier 42 to broadcast the auxiliary data at high signal-to-noise levels. Thus the unmodulated level of the 38 kHz subcarrier may be set, for example, to a 20 to 40% FM modulation level of the main carrier, and may be AM modulated up to a level of 100%.

Figure 8:
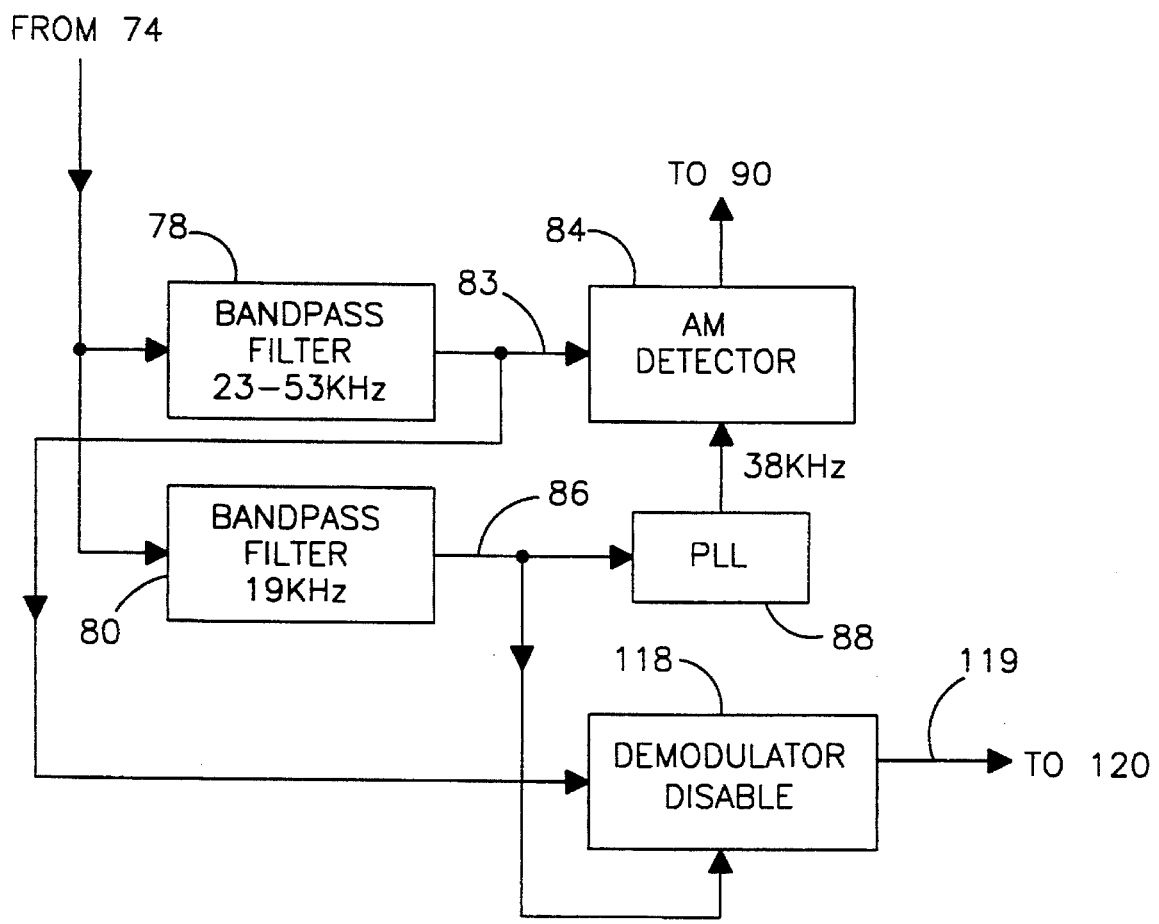
FIG. 8 is a functional block diagram showing a modification of the receiver of FIG. 4 to demodulate the auxiliary data subcarrier transmitted using the modification of FIG. 7.

FIG. 8 shows the modifications to the receiver system 70 of FIG. 4 to receive and demodulate the 38 kHz carrier. The output signal on the line 83 from the filter 78 is provided to an AM demodulator 170 which is used in place of, and may be similar in construction to the modulator 118, but which also includes a disable signal input terminal which is connected to the line 86 to receive the stereo pilot signal as a disable signal. The output signal from the demodulator 170, which represents the pulse code sequence for the digital message, is provided to the data input terminal of the processor 120 on the line 119.

During monophonic operation, the absence of the stereo pilot signal disables the DSBSC detector 84, and enables the demodulator 170. Accordingly, no spurious audio signals are reproduced by the speakers 96 and 98 in response to the presence of the 38 kHz subcarrier, which is demodulated by the circuit 170, and the resultant message data is provided to the processor 120. This mechanization also does not disturb the operation of conventional FM stereo receivers, since the absence of the stereo pilot during monophonic operation also operates to disable the DSBSC detector 84 in these units.

While the above-described system uses a 38 kHz subcarrier in place of the stereo pilot to broadcast the auxiliary data during monophonic transmission, it is envisioned that other subcarrier frequencies in the spectra above the frequency of the stereo pilot (19 kHz) and extending to and including the upper frequency of the DSBSC signal (53 kHz) may be used as well. Further, other amplitude modulation techniques may be employed to AM modulate the 38 kHz subcarrier, other than PAM modulation. For example, tone modulation techniques may be employed where the pulses from the code generator 58 modulate a tone signal which in turn AM modulates the subcarrier. Such techniques may be employed to decrease the response time of the circuits used in the AM demodulator 170.

Figure 9:
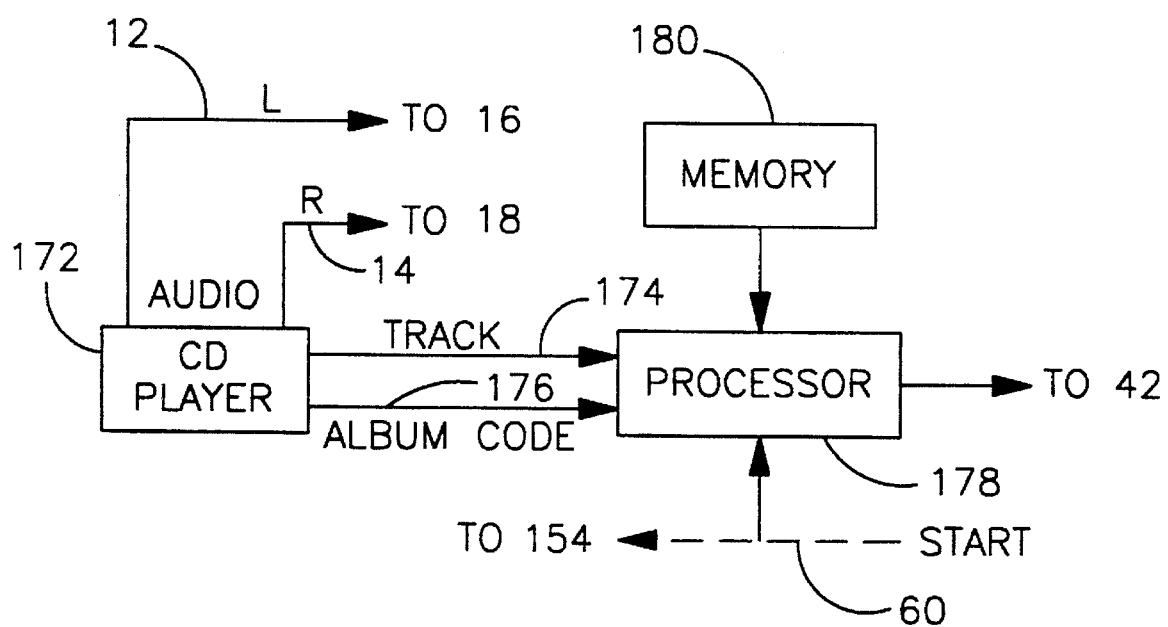
FIG. 9 is a functional block diagram showing the use of a compact disc player and a digital processor for automatically providing the auxiliary digital data signal for transmission by the transmitter of FIG. 1, where the data signal represents the title, artist and album corresponding to the musical selection being played by the player.

A system for implementing the functions of the data source block 54 and the code generator block 58 in FIG. 1 is shown in FIG. 9. As described above, the block 54 is used to provide a digital signal which contains the musical selection identifying data, preferably in the form of the title, artist and album name relating to that selection. In FIG. 9, there is shown a compact disc. (CD) player 172 used as the source of the stereophonic audio signals provided on the lines 12 and 14 to the transmitter system 10. Thus a stereo music selection is broadcast by inserting a particular CD in the player 172, and selecting a particular track to be played.

The majority of compact discs contain digitized data corresponding to an album of musical selections performed by a particular artist or artists. Each of the selections is provided on a separate track, which is selected by number. The compact disc contains sub-tracks containing additional data such as the total number of tracks, and the time duration of each selection. Many CDs also contain a disc identification number, which can be thought of as an album code, and which can be used to uniquely identify that disc from other discs.

The player 172 provides separate output digital signals on the lines 174 and 176 which contain the track number selected, and the disc identification data, respectively. These signals are provided to input terminals of a digital processor 178, which may be in the form of a mini-computer, to which is connected a memory storage device 180 which may be in the form of a floppy or hard disk. Stored in this memory device is a table which lists the album identification codes for a plurality of CDs, along with the name of the album and the performing artist. Also stored in this table are the track numbers for each disc, and the name of the selection corresponding to that track. It is envisioned that the data in this table will be updated periodically as new CDs are released.

In response to the signals on the lines 174 and 176, the processor 178 provides a look-up function using the data in the stored table to determine the album name, artist name and musical selection title to be broadcast. This data is combined with suitable SOM, EOM and error correcting codes, which are assembled into the desired pulse code sequence and amplitudes to be provided to control the gain of the amplifier 42. In response to the start signal on the line 60 (also provided to the processor 178), the pulse code sequence is provided on the line 62 to the amplifier 42.

Figure 10:
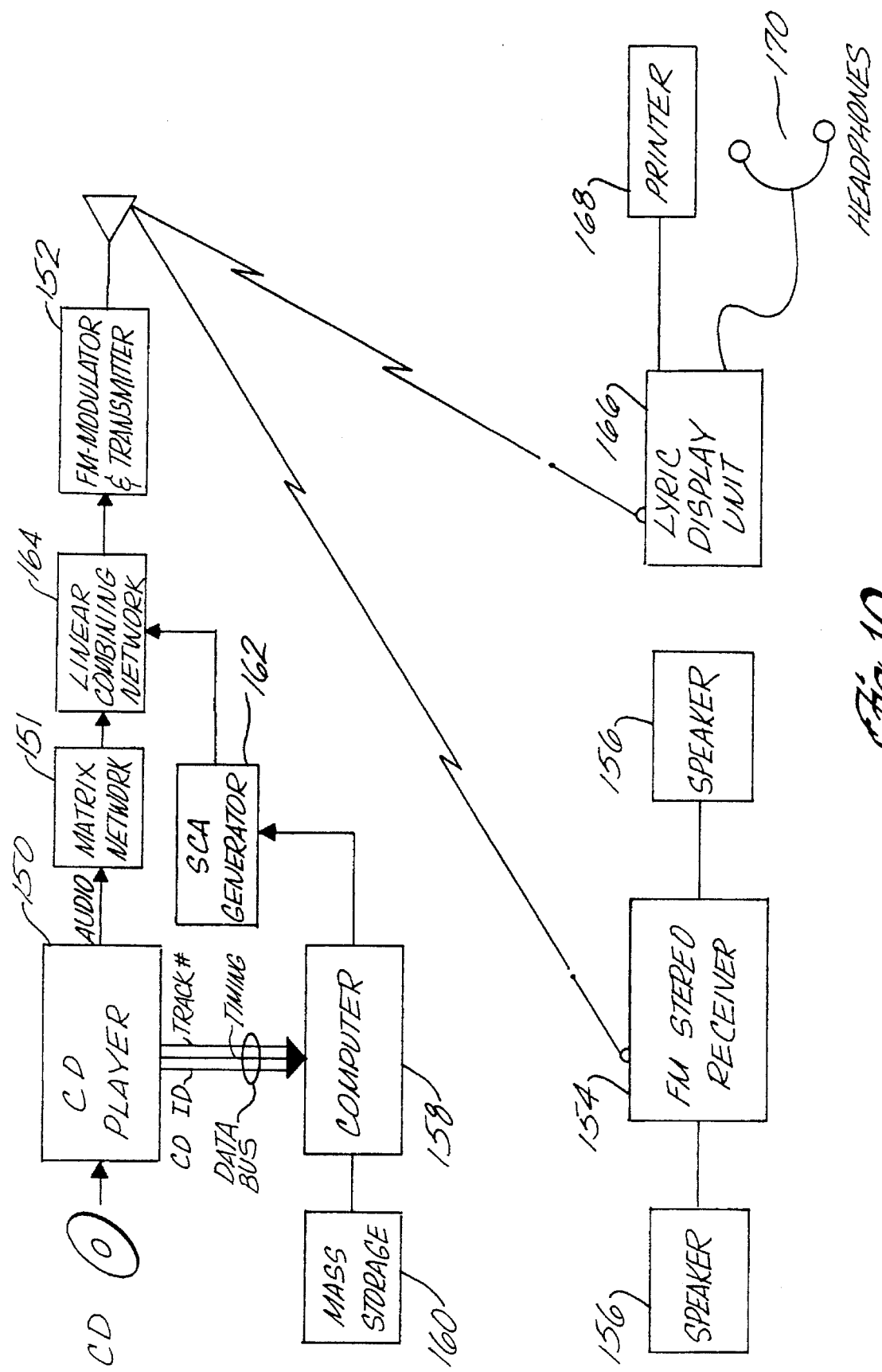
FIG. 10 is a block diagram of a system for broadcasting lyric information corresponding to music being broadcast simultaneously.

Another embodiment, shown in FIG. 10, is a system that broadcasts lyrics information along with audio music. In conventional FM broadcasting systems, the music is taken from a source such as a CD player 150 which produces an analog audio signal. The audio signal is passed through a matrix network 151, such as the one shown in FIG. 1, and broadcast by an FM transmitter 152. The FM signal generated by the transmitter is received by an FM receiver 154 which, when it is tuned to the frequency of the transmitter, converts the FM signal into signals that drive loudspeakers 156, reproducing the music that originally was produced by the CD player.

In the system shown in FIG. 10, data regarding the music selection being played by the CD player is output to a computer 158. This data includes an identification number that identifies the CD being played, a track number that identifies the track of the CD that has been selected to be played and a signal that indicates the time elapsed from the beginning of the selected track.

Although most CD players utilized by radio stations are able to send CD and track identification and elapsed time signals to a computer, some are not. In these cases the CD and track identification numbers can be input manually into the computer using the computer's keyboard. The time elapsed signal can be artificially created by the computer itself if the computer is signalled with the time the musical selection begins to be played by the CD player.

A list of a number of CD and track identification numbers can be entered into the computer at one time in the order in which the musical selections corresponding to the CD and track data are to be played by the radio station during a period of time. In such cases, the radio operator would only have to indicate to the computer when each musical selection started. After a start indication is received by the computer, the computer assumes that the next start signal it receives will be for the next CD and track identification numbers on the previously entered list of CD and track identification numbers. Depending on the operation of the radio station, these CD and track data lists could be entered covering the music to be broadcast for periods of full days or longer.

The entry into the computer of the start signal could be performed manually by a key on the computer being pressed when the musical selection starts. Alternatively, if the CD player provides an output the indicates that the PLAY, PAUSE, CUE or similar button on the CD player has been pressed, this output can be sent to the computer to indicate the start of the musical selection. Another alternative is to include in the system an audio level meter that detects a rise in the audio level output by the CD player, signifying the start of the musical selection being played by the CD player and sends a signal to the computer indicating this.

Based on the CD and track identification and elapsed time data received, the computer retrieves lyrics and lyric timing data from a mass storage device 160 for the music selection contained on the selected track of the CD. The computer sends the lyrics and lyric timing data to a subcarrier band signal generator 162, whose output is combined with the analog audio output from matrix network 151 by a linear combining network 164 such as the linear combining network 26 shown in FIG. 1. The output of the linear combining network is then transmitted at the FM frequency of the radio station. The combined audio and subcarrier signal is received by both standard FM radio receivers 154 and by lyric display units 166.

The operation of the FM radio receivers is not affected by the added subcarrier signal. The lyric display unit, on the other hand receives both the main audio radio signal and the subcarrier signal. The data broadcast over the subcarrier signal is interpreted by the lyric display unit, which displays series of phrases of lyrics. After the words of each phrase of lyrics are displayed, individual words or lines of words can be highlighted. Highlighting can be accomplished by underlining, switching background and foreground colors or shades, using a bouncing ball or any other highlighting method that the display on the lyric display unit is capable of implementing. The data output by the computer and transmitted over the subcarrier band includes signals that allow the lyric display unit to highlight individual words or lines in synchronization with the music that is received by FM receivers tuned to the same radio station. The lyric display unit also includes a port for outputting the lyric information to a printer 168 and an ordinary FM receiver that outputs an audio signal to headphones 170.

Figure 11:
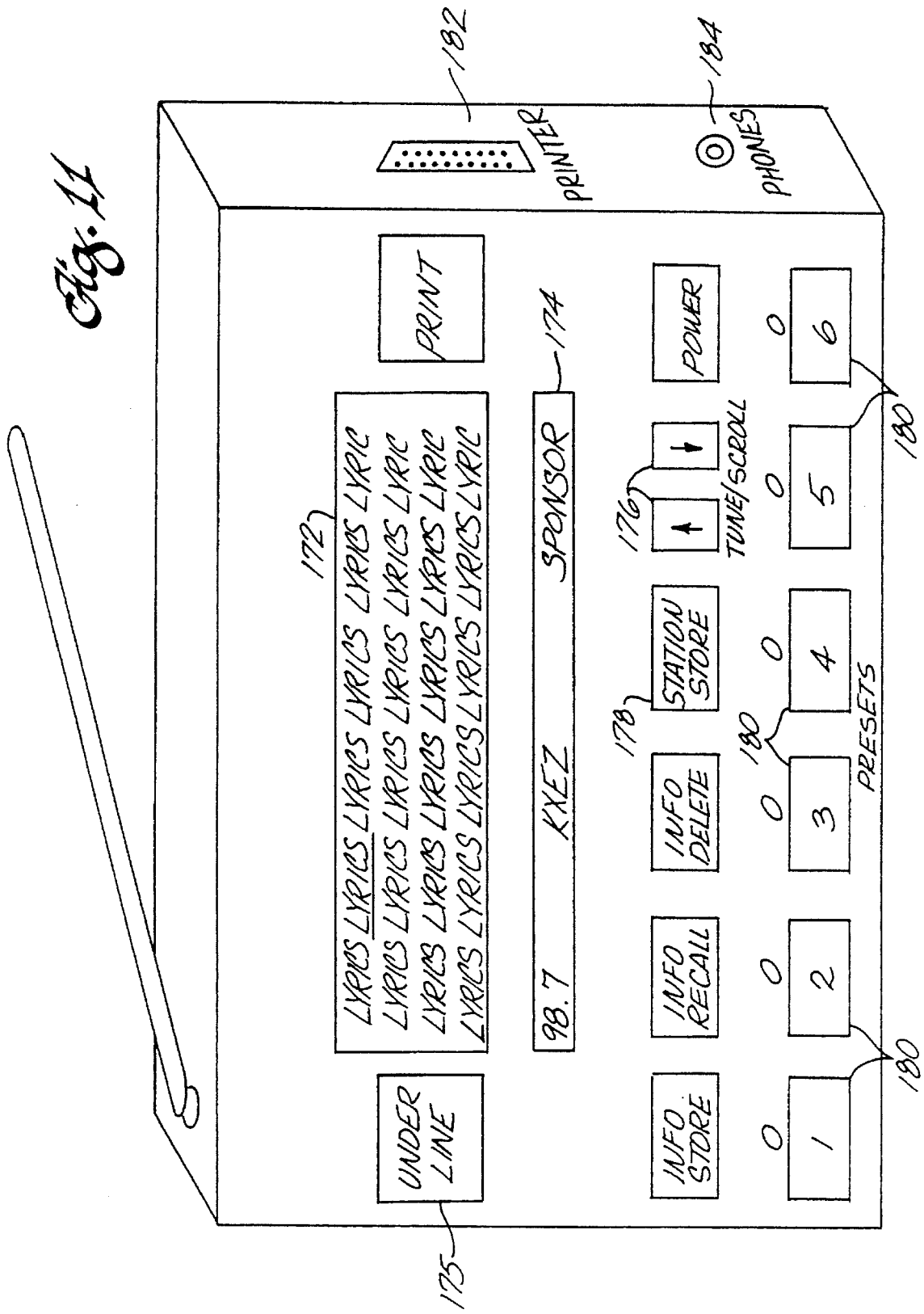
FIG. 11 is an external view of a lyric receiver and display unit.

FIG. 11 shows an embodiment of lyric display unit 166. The lyric display unit includes two display screens, a lyrics display screen 172 and a tuning display screen 174. The lyric display screen shown is a four line by forty character liquid crystal display (LCD), but could be any suitable display device, including different size LCDs. The lyric display screen is capable of highlighting certain words or lines shown on the display. Such words or lines can be highlighted using methods including, but not limited to underlining, displaying in bold, or in inverse (e.g. white on black instead of black on white) and using a "bouncing ball" indication. The lyric display unit can be capable of different highlighting methods, which can be selected by the user by pressing the underline button 175. The tuning display screen shown is a one line, 40 character LCD and could also be any kind of suitable display and can be combined as part of display 172 if desired. The tuning display shows the frequency of the FM station currently tuned, the call letters of that station and can display the name of an advertiser that is sponsoring the broadcasting of the lyrics.

FM stations can be tuned by using the Tune up and down buttons 176. The tuning frequency for any station can be stored by the listener in "preset" memory locations similar to those found in most electronic car radios. A preset memory is set by tuning the station with the tune up and down buttons 176, pressing the station store button 178 and then one of the numbered preset buttons 180. FIG. 11 shows a lyric display unit with six presets, by way of example, but any number of presets can be provided. The preset station can then be tuned simply by pressing the preset button that was programmed.

In order to pay for the cost of broadcasting lyric data, radio stations may sell time on the lyric display to advertisers. Thus, an advertiser can have a standard audio commercial played over the radio while simultaneously having critical information such as the advertiser's name, phone numbers and addresses displayed on the lyric display. In order to make the display of this information most useful to the listener, the listener may temporarily store advertising information in any of the memory locations corresponding to the preset buttons 180. The listener stores, retrieves or deletes advertising information using either the INFO STORE, INFO RECALL or INFO DELETE buttons followed by one of the six preset buttons 180. The memories used to store advertising information are distinct from the station preset memories even though the same numbered preset buttons 180 are used in their selection.

When advertising information is stored using the INFO STORE button followed by a preset button, the light emitting diode (LED) above the preset button pressed is illuminated, or another visual indicator used, to show that that memory location is occupied. The user is prevented from storing additional advertising information in any occupied memory location, i.e. a preset button with its LED illuminated. An audible indication can also be given to inform the user that the memory location is occupied. An occupied memory location can be cleared by pressing the INFO DELETE button followed by the preset button associated with the memory location to be cleared. The LED above the preset button associated with the cleared memory is then extinguished and the memory location is free to be used for storing other advertising material.

Alternatively, a single LED or audio signal could be used that would only alert the user when all of the available memory locations are occupied. The indicator would be extinguish or disengaged when one of the memories are cleared by the user.

Using the INFO RECALL button followed by a preset with an illuminated LED displays the information stored in the memory associated with that preset button on the display of the lyric display unit. Recalling stored information using the INFO RECALL button automatically interrupts the receipt of any advertising or lyrics information being broadcast at that time and the recalled information is automatically displayed instead of the information then being broadcast. If there is more information stored in a memory than can be displayed on the screen at one time, as will often be the case in embodiments using smaller display screens, the user may access the non-displayed information by using the SCROLL UP/DOWN buttons.

An alternative method of storing, recalling and deleting advertising information involves using only the INFO STORE, INFO RECALL and INFO DELETE buttons without using preset buttons. In this method, when a user desires to store the advertising information displayed on the lyric display unit, he or she simply presses the INFO STORE button. The lyric display unit automatically stores the advertising information into the first available memory location and the LED associated with that memory location is illuminated. To recall information from memory locations, the user can repeatedly press the INFO RECALL button, which cycles through the occupied memories, displaying the advertising information stored from each occupied memory. When the advertising information from a particular memory location is currently being displayed, after using the INFO RECALL button, pressing the INFO DELETE button will cause that memory location to be cleared and the LED associated with that memory location extinguished.

Advertising information can also be output to a printer through printer port 182 when it is received or after being recalled from a memory by pressing the PRINT button. The lyric display unit also includes a standard FM receiver with output to a headphone jack 184.

FIG. 12 shows a block schematic of lyric display unit 160. The lyric display unit receives FM radio signals with receiving antenna 186. The antenna supplies an input to a standard FM tuner chip or chip set 188. The FM tuner chip 180 tunes to an FM frequency using a standard frequency synthesizer 190 such as a phase lock loop. The signal tuned by the FM tuner chip and the frequency synthesizer is directed to standard stereo audio circuits 192 and a subcarrier decoder 194. The stereo audio circuits supply audio signals to a headphone jack 184 so that the listener can listen to the music being broadcast on the selected FM station. An amplifier capable of driving loudspeakers could also be included.

Any of a variety of subcarrier techniques can be used to broadcast, receive and decode the lyrics data, including the subcarrier broadcasting system shown in FIGS. 1 through 3 and 5 through 8. In the embodiment shown in FIGS. 10 through 16, the standard, well known SCA subcarrier band is utilized, including an SCA decoder as the subcarrier decoder 194. Many other subcarrier techniques may be used, including the subcarrier described above, but the SCA subcarrier band is adequate for use in this embodiment. The subcarrier decoder outputs the decoded data to the central processor unit (CPU) 196. The CPU includes a read-only memory (ROM) that stores a program that controls the operation of the CPU. The CPU and program stored in ROM interpret the data output by the subcarrier decoder and parse the data into commands and character data. The commands found in the lyric data are executed to determine where on the display 198 (display 198 can include both a lyrics display screen 172 and tuning display screen 174 shown in FIG. 11) to place the characters represented by the character data. The commands also direct which characters are to be highlighted and when. The CPU also stores lyric or advertising data into memory, such as random access memory (RAM) 200 and can also send the data to the printer port 202 based upon signals received from the controls 204 operated by the listener.

Sufficient memory is allotted in RAM 200 to store at least two phrases of lyrics. This allows one phrase to be displayed from data already stored in memory while a subsequent phrase is simultaneously transmitted and stored in a memory buffer. This architecture avoids the need to rapidly transmit a phrase at the completion of a previous phrase, as discussed more fully below.

While the lyric display unit 166 is shown as a separate component used with a receiver 154, it is contemplated that the unit 166 Will be integrated into future models of both portable and stationary FM stereo receivers. It is also contemplated that the lyric and advertising text and command format will be made compatible with the radiotext mode of broadcasting in the SCA band as described in the Radio Data System (RDS) specification published by the European Broadcasting Union, 1984, and the corresponding United States version of that specification, which has not issued as yet and is entitled "Specification of the Radio Broadcast Data System" (RBDS).

The lyrics and lyric timing data to be broadcast to the lyric display unit over the SCA subcarrier band are generated using the combination of a CD player 210 and a computer 212 shown in FIG. 13. The CD player 210 used in the preferred embodiment is a Studer A730 Professional Compact Disc Player. The computer can be any personal computer but is an IBM-compatible personal computer, including RAM memory, a hard disk drive and a display in the preferred embodiment.

Compact discs store analog music as digital information, that is as a series of 1's and 0's. This format allows the easy embedding of control information such as album identification numbers, track numbers and elapsed time with the digital representation of the music. Compact discs are divided up into many "frames" of information. The format of each frame is identical and contains a predetermined amount of digital information, including both audio data and control data. Seventy-five frames contain the information for each second of audio material stored on a compact disc. Frames within a certain track are referred to by their sequence in time from the beginning of the track expressed as a six digit decimal code: two digits for minutes, two digits for seconds and two digits for frames. Each frame on a compact disc includes such a six digit code in its control data, uniquely identifying the particular frame. More details regarding the coding of compact disc can be found in the International Standard for the "Compact disc digital audio system," published by the International Electrotechnical Commission (CEI IEC 908, 1987).

The Studer A730 Professional Compact Disc Player includes a data output port that is connected to the computer. The data output to the computer on this port includes the album identification number, track number and the minute, second and frame data read for each frame on the compact disc as the disc is being played. The album identification number is provided in a subcarrier channel on the CD as described in the International Standard.

The actual creation of the lyric and lyric timing data is as follows. The first step is to either manually enter the lyrics into the computer or obtain the lyrics in computer readable form from another source, such as the artist or music publisher. The lyrics are then split into phrases, generally from three to ten words, so that the entire phrase can be displayed at one time on the display screen 172 of the lyric display unit. If a phrase buffer as described above is not employed, the phrases should also be selected so that, if possible, about a half second pause in the music coincides with the breaks between phrases.

Once the phrases are determined, the second step is begun by playing the CD on the professional CD player. The Studer CD player allows the music to be listened to at adjustable speeds, if necessary, allowing the user to pinpoint the actual frame in which each word of the lyrics are begun to be sung. It is sometimes important to determine the lyric timing down to the frame level of detail (1/75 of a second) because certain music, particularly rap, often averages four words or more per second throughout an entire musical selection. Once the beginning of a word is detected by the listener, the listener signals the computer that the word has begun to be sung. The computer automatically stores the minute, second and frame data from the timing output signal of the CD player and associates this information with the word that is being sung. The second step is repeated until timing data is stored for every word in the musical selection.

By using this process, lyrics files that include phrasing and timing data for any musical selection can be generated using the computer and CD player combination. An example of how this information can be stored is shown below. The beginning of each phrase is denoted by a tilde (~). The end of each line within a phrase is denoted by an "at" symbol (@). The end of each phrase is denoted by a caret (^), while the end of each word is denoted by a vertical bar (¦). Thus the phrasing data for "Mary had a Little Lamb" may look like the following:

```
~Mary|had|a|little|lamb@|
little|lamb|little|lamb^|
~Mary|had|a|little|lamb@|
whose|fleece|was|white|as|snow^|
```

Timing data can be added by inserting a number consisting of the six digit minute, second and frame received from the compact disc player, with leading zeros deleted after each word of the lyrics, separated by another vertical bar (|) and with a space before the number to distinguish timing numbers from lyrics that happen to be numbers. Thus the phrasing of Mary had a Little Lamb including time data may look like the following:

```
~Mary| 448|had| 524|a| 552|little| 573|lamb@| 648
little| 723|lamb| 773|little| 848|lamb^| 923
~Mary| 973|had| 1048|a| 546|little| 1122|lamb@| 1173
whose| 1227|fleece| 1248|was| 1301|white| 1323|as| 1351|snow^| 1373
```

FIG. 10 shows how the lyric and timing data is transmitted to the lyric display unit. When a CD is cued for broadcast, the album identification number and track number of the CD are output from the CD player 150 to the computer 158. The mass storage device 160 connected to the computer contains lyric and timing data files for a large number of musical selections. These files are indexed by album identification number and track number. Thus, when the album identification number and track are received by the computer from the CD player, the lyric and timing file for that musical selection can be quickly found and retrieved.

As described above with respect to FIG. 10 and the broadcasting of the lyric data, if the CD player being used in conjunction with the creation of the lyric and timing data files does not output the CD identification and track numbers and the elapsed time data this data can be entered into the computer by other methods. The CD identification and track numbers can be entered manually using the computer keyboard. The elapsed time can be calculated by the computer from a start signal obtained through the computer's keyboard, a PLAY, PAUSE, CUE or other operational status signal received from the CD player, an audio signal meter connected to the output of the CD player or any other way to detect the start of the musical selection.

Once the correct lyric and timing file is accessed, the computer must generate and transmit commands and data that will be interpreted by the lyric display unit to properly display the lyrics and the highlighting. The commands and data are output by the computer to the SCA generator phrase by phrase.

As soon as the lyric and timing file is retrieved, the text data for the first phrase is sent to the SCA generator. The text data includes command codes indicating the start of the phrase, the separation of the individual words within the phrase, breaks between the lines of text within the phrase and the end of the phrase. Thus, the lyric display unit, upon receiving this data, can determine how many words are in the received phrase. The computer 158 then monitors the minute, second and frame output of the CD player. When the minute, second and frame match the minute, second and frame of the first word of the current phrase, a "highlight" command is generated and sent through the SCA generator to the lyric display unit, which highlights the first word of the phrase as soon as the code is received. When the minute, second and frame data from the CD player matches the minute, second and frame of the second word in the current phrase, another "highlight" command is generated and broadcast to the lyric display unit which then highlights the second word of the phrase it received. This process is repeated until the highlight command is generated for the last word of the current phrase. When the entire phrase has been highlighted, the computer then repeats the whole process by sending the text data for the next phrase through the SCA generator and to the lyric display unit.

Alternatively, and preferably, the data for a subsequent phrase is formatted and transmitted prior to the time of completion of the present phrase, and is stored in a suitably provided buffer in the lyric display unit. After the complete subsequent phrase has been broadcast to the lyric display unit and the highlight command for the last word of the current phrase has been broadcast, but before the time for broadcasting the highlight command for the first word or line of the subsequent phrase, a "change phrases" command is broadcast. Upon receipt to the "change phrases" command, the lyric display unit clears the present phrase from memory and the display, displays the subsequent phrase, and either transfers the data for the subsequent phrase from the phrase buffer to the memory for the present phrase or simply swaps the locations of the present phrase memory and the phrase buffer. At this point the subsequent phrase becomes the present phrase and the process is repeated until the end of the musical selection.

In an alternative method of broadcasting the lyric text data and lyric timing commands, when the lyric and timing file is retrieved, the text data for the first phrase is sent to the SCA generator. The text data includes command codes indicating the start of the phrase, the separation of the individual words within the phrase, breaks between the lines of text within the phrase and the end of the phrase. The text data also includes commands that direct the highlighting of the individual words or lines by the lyric display unit. Included for each word in the phrase or for each line of the phrase is command that includes an offset time. The offset time is the length of a delay that should occur from the receipt by the lyric display unit of a timing signal, corresponding to a predetermined reference point in time, and the time when the lyric display unit highlights the word or line. Using the "Mary had a Little Lamb" example from above, the highlight command code could include "448" (four seconds and 48 frames or 4 and $^{48}/_{75}$ seconds) indicating the time after the start of the song that the word "Mary" is to be highlighted. If this scheme is used, a "start" signal must be sent to the lyric display unit at the exact time when the song begins to be played by the CD player. The lyric display unit is then responsible for comparing the highlight command with an internal clock and the time when the "start" signal was received by the lyric display unit to determine when each word should be highlighted. It is important to note that the text data of any phrase can be transmitted before or after the "start" signal is transmitted. In the "Mary had a Little Lamb" example, the "start" signal could be broadcast before the first phrase, provided that the text data for the first phrase is broadcast at least within 4 $^{48}/_{75}$ seconds of when the "start"

signal is broadcast. Accordingly, subsequent phrases can be broadcast at any time before the first word in the phrase needs to be highlighted. Of course, the timing signal can be associated with any predetermined temporal reference point that occurs before the first word of lyrics with which the reference point is used for highlighting purposes.

Data can routinely be transmitted over the SCA band at a rate of about 2400 bits of data per second. At this rate, four full forty character lines can be transmitted in about one-half of a second. Therefore, when a phrase buffer is not used and the phrasing of a particular musical selection is being determined, efforts should be made to have the breaks between phrases coincide with periods in the musical selection without lyrics of at least a half of a second.

Again though, an alternative and preferable method is to employ the phrase buffer described in detail above, so that after one phrase of lyric text and timing commands has been broadcast and being currently displayed by the lyric display unit, the next phrase of lyrics and associated timing commands can be broadcast to the lyric display unit and stored in its display buffer until the current phrase is completed. Using this method eliminates the need to be concerned about parsing lyrics into phrases so that there are half second pauses between phrases.

Another subtlety in broadcasting the highlight commands is that the comparison between the minute, second and frame output by the CD player and the minute, second and frame in the lyric and timing file should be performed taking into consideration that there is a small, but constant delay between the receipt of the timing data from the CD player and the generation, broadcast, receipt and processing of the highlight commands. This delay should be subtracted from the minute, second and frame data from the lyric and timing files before comparison to the CD player generated data so that highlighting occurs in synchrony with the music and does not suffer from a slight lag.

Figure 14:
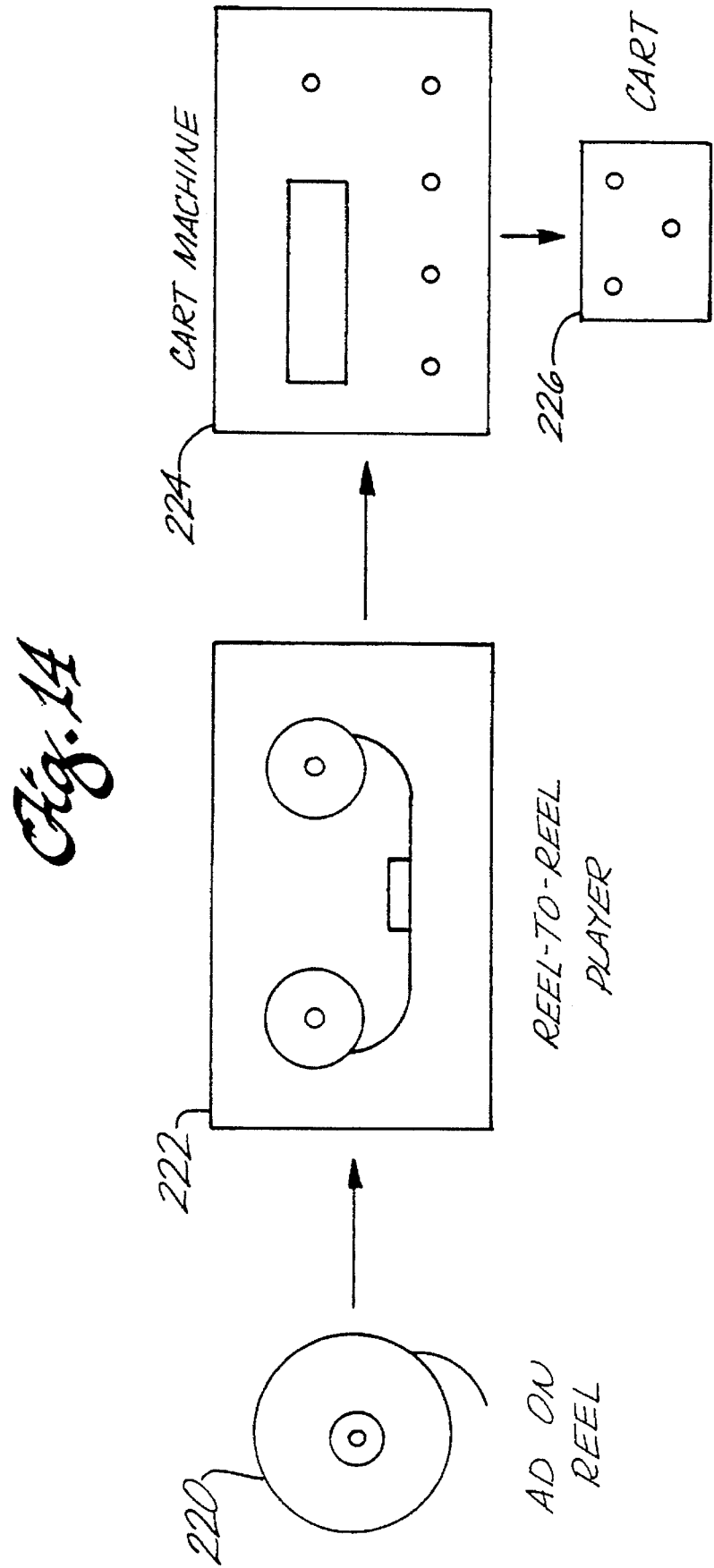
FIG. 14 is a depiction of the prior art method of converting commercial messages to a form useful to radio stations.

A problem with the lyric display system described above is that most advertisements are not supplied to radio stations on compact disc or in any other digital format that includes provisions for embedding data. As shown in FIG. 14, commercials are usually supplied to the radio station on reel-to-reel magnetic tape 220. Radio station personnel then transfer the commercials from the reel-to-reel tape onto analog magnetic endless tape cartridges 226 ("carts") that are used on standard radio station audio tape cartridge ("cart") machines 224 such as the ITC Delta series of recorders and reproducers, distributed by Harris Allied International, Richmond, Ind.

Figure 15:
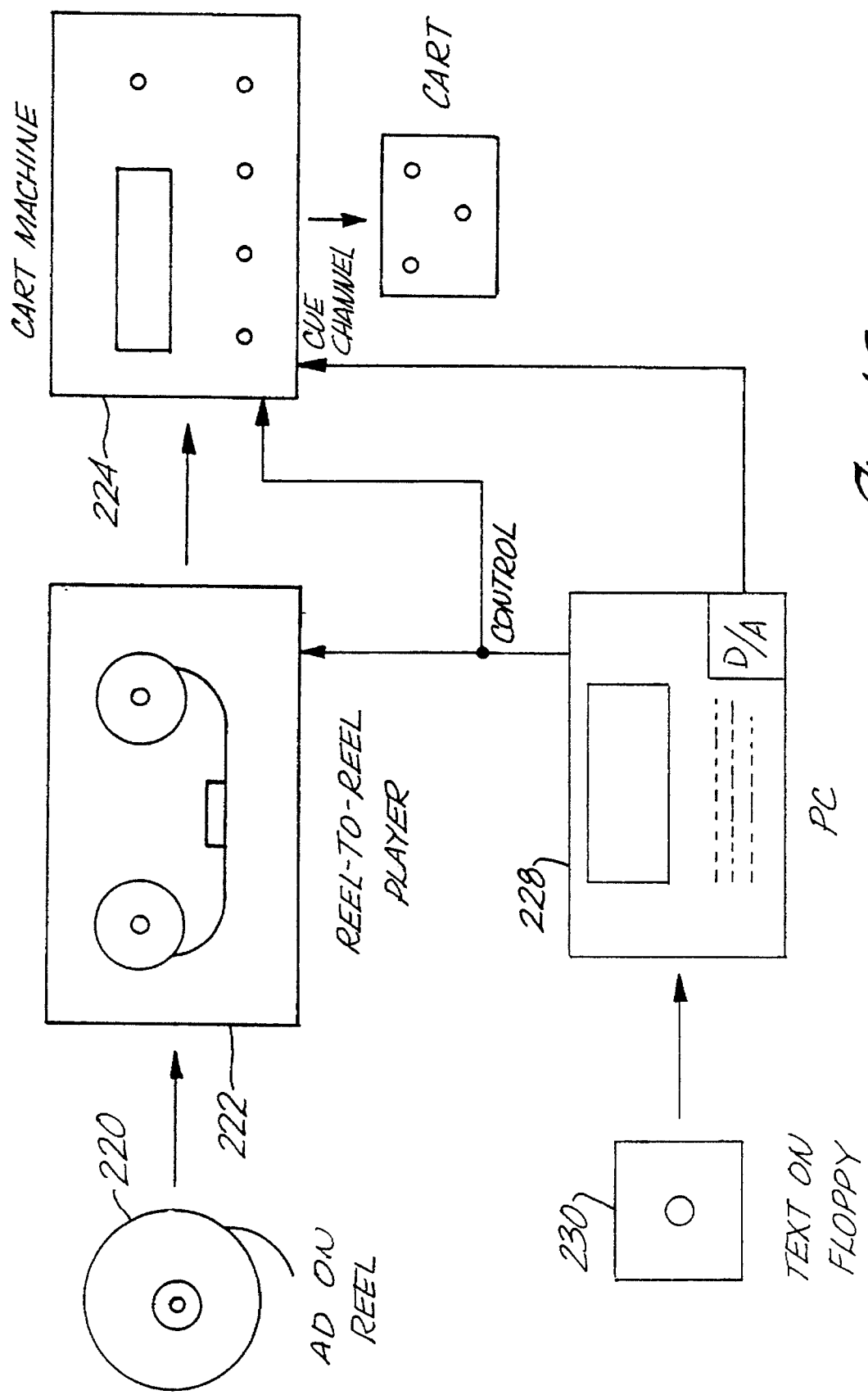
FIG. 15 is a block diagram showing a system for embedding digital data that supplements commercial messages onto tape cartridges used by radio stations to store the main commercial messages.

A solution to this problem is disclosed in the system shown in FIGS. 15 and 16. The analog magnetic tape cartridge systems that are standard in radio broadcasting include a cuing track on which cuing signals, consisting of various audio tones, are placed. This system is described in detail in the National Association of Broadcasters Specification for Cartridge Tape Recording and Reproducing, 1976. Each radio station adds its own cuing signals because radio stations have widely varying procedures regarding pauses, delays and other logistical details regarding the playing of commercial advertisements.

In the system shown in FIGS. 15, a computer 228 is connected so that it can control the operation of both the reel-to-reel tape machine 222 and the cart machine 224. Alternatively, the reel-to-reel tape machine can control both the cart machine and the computer with similar results. The advertiser supplies both a reel-to-reel tape 220 containing the audio portion of the commercial as usual, but also supplies a floppy diskette 230 that contains the text to be displayed on the lyric display unit. The computer 228 can then, using a digital to analog converter, store the text to be displayed and any commands that need to be transmitted to the lyric display unit onto the standard cuing track of the cart. Since the computer can control both the reel-to-reel tape machine and the cart machine, the computer can have the audio portion of the commercial transferred to the cart machine simultaneously with the transfer of the analog coded advertising text.

The broadcasting of advertisements recorded in this way are performed by the system shown in FIG. 16. The computer 232 is controlled by the cart machine 234 using a control line. When an advertisement is being played from a cart, the cart player alerts the computer through the control line. The computer then monitors the cue channel and upon detecting text and commands for use with a lyric display unit, these commands are converted back to digital form, output to the SCA generator and broadcast to lyric display units.

A variation of the system shown in FIGS. 15 and 16 does not affect the hardware connections of the system. However, instead of the text and display commands being converted to analog and stored on analog tape, a unique commercial identification code can be converted into analog tones and placed on the cuing track. The text and display commands for all commercials are then stored on a mass storage device, indexed by the commercial identification code. When an advertisement is then played on cart machine 234, only the unique commercial identification number needs to be detected by the computer and converted from analog to digital. The computer's index is searched for the entry corresponding to the unique commercial identification number received from the cart machine and the text and display commands stored on the computer's mass storage are retrieved by the computer and output to the SCA generator and broadcast in the same manner as described above.

Another variation of the system shown in FIGS. 15 and 16 does not utilized the cuing track of the carts to store data. A list of the unique commercial identification codes corresponding to the commercials to be aired during a period of time can be entered into the computer all at one time in the order in which the commercials corresponding to the commercial codes are to be aired. Similarly to the embodiment described above where a list of data regarding music selections to the aired are entered into the lyric generating computer, the operator only has to indicate to the computer when each commercial begins. After the computer receives a start indication for the current commercial on the list, the computer will output the supplemental data as in the systems described above and assumes that the next start signal it receives will be for the next commercial on the list that was entered into the computer. The start signal does not have to be manually entered, but similarly to the lyric generating system, could consist of a cuing signal received from the cart machine playing the commercials or an audio level meter connected to the audio output of the cart machine that detects the beginning of a commercial.

This system described immediately above for commercials can also be combined with the similar system described above for generating lyrics text and timing data based on a pre-entered list of data for musical selections to be played. A computer is simultaneously connected both as the system shown in FIG. 10 and as the system shown in FIGS. 15 and 16. A combined list is created that lists album identification and track numbers and commercial identification codes in the order that corresponding music and commercials are to be aired. Similar to the separate lyric and commercial systems, the operator would indicate to the computer the time whenever either a music selection or a commercial began. Alternatively, audio level meters or signals from the CD player and cart machine could be used to signal the computer as to the start of music selections or commercials in the same manner as in the individual lyrics and commercial systems described above. When the computer receives a start signal, it outputs the appropriate lyric text and timing data for music selection or the appropriate supplemental advertising data for commercials and waits for the next start signal that will correspond with the beginning of the next music selection or commercial on the combined list stored in the computer.

While there have been shown and described preferred embodiments of the present invention, it is not intended that the invention be limited solely to these embodiments. It is therefore to be understood that because various other embodiments may be devised by those skilled in the art without departing from the spirit and scope of the invention, it is the intention of the inventor to be limited only by the claims appended hereto.

What is claimed is:

1. A method for storing supplemental textual data to be used in subcarrier broadcasts with audio commercial advertisements that are to be broadcast simultaneously with the supplemental textual data comprising the steps of:

supplying an audio commercial advertisement on analog reel-to-reel tape, supplying supplemental textual data in computer readable form, providing a computer connected with a reel-to-reel tape deck and a magnetic tape cartridge recorder so that the computer controls the operation of said tape deck and said cartridge recorder, connecting the output of said tape deck to the audio input of said cartridge recorder, converting said supplemental textual data into analog audio signals using a digital to analog converter connected to the computer, under control off said computer, simultaneously playing the audio commercial advertisement on the tape deck, outputting the converted supplemental textual data to the cue channel input of said cartridge recorder and recording the signals received from said digital-to-analog converter and said tape deck by said cartridge recorder.

2. A method for broadcasting audio commercial advertisements simultaneously with subcarrier supplemental commercial textual data comprising the steps of:

providing a cartridge for use with a magnetic tape cartridge player that contains said audio commercial advertisement on an audio track and an analog conversion of said supplemental commercial textual data on a cuing track, providing a computer under control of said cartridge player, said computer having a analog-to-digital converter coupled to the cuing track output of said cartridge player, under control of said cartridge player, playing said cartridge and outputting the analog audio signal to an FM radio transmitter and outputting the analog supplemental textual data through the analog-to-digital converter to a subcarrier code generator.

3. A method for storing supplemental textual data to be used in subcarrier broadcasts with audio commercial advertisements that are to be broadcast simultaneously with the supplemental textual data comprising the steps of:

supplying an audio commercial advertisement on analog reel-to-reel tape, supplying supplemental textual data in computer readable form, providing a computer connected with a reel-to-reel tape deck and a magnetic tape cartridge recorder so that the computer controls the operation of said tape deck and said cartridge recorder, connecting the output of said tape deck to the audio input of said cartridge recorder, assigning a unique identification code to said audio commercial advertisement, storing said supplemental textual data in a file in said computer accessible by said unique identification code assigned to said corresponding audio commercial advertisement, converting said unique identification code into analog audio signals using a digital to analog converter connected to the computer, under control of said computer, simultaneously playing the audio commercial advertisement on the tape deck, outputting said converted unique identification code to the cue channel input of said cartridge recorder and recording the signals received from said digital-to-analog converter and said tape deck by said cartridge recorder.

4. A method for broadcasting audio commercial advertisements simultaneously with subcarrier supplemental commercial textual data comprising the steps of:

providing a cartridge for use with a magnetic tape cartridge player that contains said audio commercial advertisement on an audio track and an analog representation of a unique identification code associated with said audio commercial advertisement on a cuing track, providing a computer under control of said cartridge player, said computer having a analog-to-digital converter coupled to the cuing track output of said cartridge player, and under control of said cartridge player:

playing said cartridge and outputting the analog audio signal to an FM radio transmitter and outputting said analog representation of a unique identification code to the analog-to-digital converter, converting said analog representation into a unique identification code, retrieving a file associated with said unique identification code from the computer, and outputting the content of said file to a subcarrier code generator.

* * * * *